United States Patent
Surani et al.

(10) Patent No.: US 10,593,009 B1
(45) Date of Patent: Mar. 17, 2020

(54) SESSION COORDINATION FOR AUTO-SCALED VIRTUALIZED GRAPHICS PROCESSING

(71) Applicant: Amazon Technologies, Inc., Seattle, WA (US)

(72) Inventors: Mihir Sadruddin Surani, Seattle, WA (US); Adithya Bhat, Seattle, WA (US); Malcolm Featonby, Sammamish, WA (US); Yuxuan Liu, Seattle, WA (US); Douglas Cotton Kurtz, Sammamish, WA (US); Umesh Chandani, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 145 days.

(21) Appl. No.: 15/439,751

(22) Filed: Feb. 22, 2017

(51) Int. Cl.
    *G06T 1/20* (2006.01)
(52) U.S. Cl.
    CPC ..................... *G06T 1/20* (2013.01)
(58) Field of Classification Search
    CPC ........................................ G06T 1/20
    USPC ........................................ 709/226
    See application file for complete search history.

(56) References Cited

U.S. PATENT DOCUMENTS

| | | | |
|---|---|---|---|
| 9,069,622 B2 | 6/2015 | Post et al. | |
| 9,098,323 B2 | 8/2015 | Mitra et al. | |
| 9,848,041 B2 * | 12/2017 | Einkauf | H04L 67/1076 |
| 9,916,545 B1 | 3/2018 | de Kadt et al. | |
| 2005/0193103 A1 | 9/2005 | Drabik | |
| 2007/0033156 A1 | 2/2007 | Limpert et al. | |
| 2007/0239987 A1 | 10/2007 | Hoole et al. | |
| 2008/0034200 A1 | 2/2008 | Polcha et al. | |
| 2008/0225875 A1 | 9/2008 | Wray et al. | |
| 2009/0288084 A1 | 11/2009 | Astete et al. | |
| 2010/0094990 A1 | 4/2010 | Ben-Yehuda et al. | |
| 2011/0022694 A1 | 1/2011 | Dalal et al. | |
| 2011/0083131 A1 | 4/2011 | Pirzada et al. | |
| 2011/0134111 A1 | 6/2011 | Stone | |
| 2011/0182422 A1 | 7/2011 | Anderson et al. | |

(Continued)

FOREIGN PATENT DOCUMENTS

| | | |
|---|---|---|
| CN | 102598591 | 7/2012 |
| EP | 1713231 | 10/2006 |
| WO | 2014100558 | 6/2014 |

OTHER PUBLICATIONS

Masahiro Satou, et al., "Server Side Networking for Cloud Data Centers", 2012 IEEE 1st International Conference on Cloud Networking (CLOUDNET), Nov. 28, 2012, pp. 17-22.

(Continued)

*Primary Examiner* — Esther B. Henderson
*Assistant Examiner* — Nazia Naoreen
(74) *Attorney, Agent, or Firm* — Robert C. Kowert; Kowert, Hood, Munyon, Rankin & Goetzel, P.C.

(57) ABSTRACT

A graphic session coordinator is established to enable remote virtualized graphics operations on behalf of a set of graphics request generators. A request generator submits a graphics session request to the session coordinator. A configuration operation is performed at one or more routing devices to enable graphics operation request packets from the request generator to be delivered to a first remote virtualized graphics device and to enable graphics operation response packets to be transmitted to a destination.

20 Claims, 10 Drawing Sheets

(56) References Cited

U.S. PATENT DOCUMENTS

| | | |
|---|---|---|
| 2012/0069032 A1 | 3/2012 | Hansson et al. |
| 2012/0154389 A1 | 6/2012 | Bohan et al. |
| 2014/0055466 A1 | 2/2014 | Petrov et al. |
| 2014/0169471 A1 | 6/2014 | He |
| 2014/0176583 A1 | 6/2014 | Abiezzi et al. |
| 2014/0181806 A1 | 6/2014 | Abiezzi et al. |
| 2014/0215462 A1 | 7/2014 | Kuo et al. |
| 2014/0286390 A1 | 9/2014 | Fear |
| 2015/0067672 A1 | 3/2015 | Mitra et al. |
| 2015/0097844 A1 | 4/2015 | Wankhede et al. |
| 2015/0105148 A1 | 4/2015 | Consul et al. |
| 2015/0116335 A1 | 4/2015 | Chen et al. |
| 2015/0220354 A1 | 8/2015 | Nair |
| 2015/0221063 A1 | 8/2015 | Kim et al. |
| 2015/0370589 A1 | 12/2015 | Bidarkar et al. |
| 2015/0370620 A1 | 12/2015 | Lai et al. |
| 2016/0239333 A1 | 8/2016 | Cowperthwaite et al. |
| 2016/0247248 A1 | 8/2016 | Ha et al. |
| 2017/0323418 A1* | 11/2017 | Dror .................. G06T 1/20 |
| 2018/0089415 A1* | 3/2018 | Baentsch ............ G06F 21/53 |
| 2018/0089881 A1* | 3/2018 | Johnson ............ G06F 9/45558 |
| 2018/0218530 A1* | 8/2018 | Vembu ............ G06F 9/45541 |

OTHER PUBLICATIONS

Kapil Bakshi, "Considerations for Software Defined Networking (SDN): Approaches and Use Cases", Aerospace Conference, 2013 IEEE, Mar. 2, 2013, pp. 1-9.

U.S. Appl. No. 15/417,064, filed Jan. 26, 2017, Malcolm Featonby, et al.

U.S. Appl. No. 15/249,150, filed Aug. 26, 2016, Gianpaolo Ingegneri.

U.S. Appl. No. 15/374,509, filed Dec. 9, 2016, Malcolm Featonby et al.

U.S. Appl. No. 14/822,511, filed Aug. 10, 2015. Nicholas Patrick Wilt et al.

U.S. Appl. No. 14/938,457, filed Nov. 11, 2015, Nicholas Patrick Wilt et al.

U.S. Appl. No. 14/938,461, filed Nov. 11, 2015, Nicholas Patrick Wilt et al.

U.S. Appl. No. 14/938,656, filed Nov. 11, 2015, Nicholas Patrick Wilt et al.

U.S. Appl. No. 14/938,654, filed Nov. 11, 2015, Nicholas Patrick Wilt et al.

U.S. Appl. No. 15/178,292, filed Jun. 9, 2016, Nicholas Patrick Wilt.
U.S. Appl. No. 15/177,255, filed Jun. 8, 2016, Nicholas Patrick Wilt.
U.S. Appl. No. 15/177,262, filed Jun. 8, 2016, Nicholas Patrick Wilt.
Nice, "DCV Administration Guide," Nice s.r.l, Asti, Italy, Jul. 2015, Source: https://www.nice-software.com/download/nice-dcv-2014#documentation, pp. 1-96.

Federico Silla. "The rCUDA technology: an inexpensive way to improve the performance of GPU-based clusters." Talk at Computer Engineering Laboratory, Delft University of Technology. Delft, Netherlands. Apr. 2015, pp. 1-47.

Antonio J. Pena, et al., "A Complete and Efficient CUDA-Sharing Solution for HPC Clusters", Sep. 2, 2014, Retrieved from the Internet: URL: http://www.mcs.anl.gov/papers/P5137-0514.pdf, pp. 1-28.

U.S. Appl. No. 15/249,150, filed Aug. 26, 2016, Ingegneri.
U.S. Appl. No. 15/417,064, filed Jan. 26, 2017, Featonby, et al.
Lin Shi, et al., "vCUDA: GPU-Accelerated High-Performance Computing in Virtual Machines", IEEE Transaction on Computers, vol. 61, No. 6, Jun. 2012, pp. 804-816.

Matthew Danish, et al., "Virtual-CPU Scheduling in the Quest Operating System", 2011 17th IEEE Real-Time and Embedded Technology and Application Symposium, Apr. 11, 2011, pp. 169-179.

Mark Panahi, et al., "A Framework for Real-Time Service-Oriented Architecture", 2009 IEEE Conference on Commerce and Enterprise Computing (CED '09), Jul. 20, 2009, pp. 460-467.

Marcos D. Assuncao, et al., "CloudAffinity: A Framework for Matching Servers to Cloudmates", 2012 IEEE Network Operations and Management Symposium (NOMS 2012), Apr. 16-20, 2012, pp. 213-220.

Shinpei Kato, et al., "Gdev: First-Class GPU Resource Management in the Operating System", Jun. 1, 2012, Retrieved from URL: https://www.usenix.org/system/files/conference/atc12/atc12-final1319.pdf, pp. 1-12.

Jeff Weiss, et al., "NVIDIA GRID VCPU Deployment Guide for VMWARE Horizon 6.1", NVIDIA TechPub, Mar. 1, 2015, Retrieved from URL: http://www.vmware.com/content/dam/digitalmarketing/vmware/en/pdf/products/horizon/grid-vgpu-deployement-guide.pdf, pp. 1-14.

Installing VMware VGPU on vSphere 6.0, Martijin Smit, Mar. 7, 2015, pp. 1-10.

U.S. Appl. No. 15/179,739, filed Jun. 10, 2016, Eric W, Schultze.
U.S. Appl. No. 13/833,945, filed Mar. 15, 2013, Ian Roger Searte.
U.S. Appl. No. 15/728,277, filed Oct. 9, 2017, Kevin Christopher Miller.
U.S. Appl. No. 14/548,196, filed Nov. 19, 2014, Edward Max Schaefer.
U.S. Appl. No. 15/823,185, filed Nov. 27, 2017, Kevin Christopher Miller.
U.S. Appl. No. 14/658,965, filed Mar. 16, 2015, Weili Zhong Mcclenahan.
U.S. Appl. No. 14/736,165, filed Jun. 10, 2015, Colm Maccarthaigh.
U.S. Appl. No. 16/029,468, dated Jul. 6, 2018, Kyle Tailor Akers.
U.S. Appl. No. 14/853,646, dated Sep. 14, 2015, Po-Chun Chen.
U.S. Appl. No. 16/056,078, dated Aug. 6, 2018, Unknown.
U.S. Appl. No. 15/632,258, filed Benjamin David Strauss.
U.S. Appl. No. 15/435,138, filed Feb. 16, 2017, Daniel Todd Cohn.
U.S. Appl. No. 15/702,589, filed Sep. 12, 2017, Kevin Christopher Miller.
U.S. Appl. No. 14/822,704, filed Aug. 10, 2015, Daniel T. Cohn.
U.S. Appl. No. 14/853,608, filed Sep. 14, 2015, Eric Jason Brandwine.
U.S. Appl. No. 13/829,721, filed Mar. 14, 2013, Eric Jason Brandwine.
U.S. Appl. No. 15/382,403, filed Dec. 16, 2016, Daniel Todd Cohn.
U.S. Appl. No. 15/011,302, filed Jan. 29, 2016, Eric Jason Brandwine.
U.S. Appl. No. 15/996,371, filed Jun. 1, 2018, Eric Jason Brandwine.
U.S. Appl. No. 15/663,592, filed Jul. 28, 2017, Kevin Christopher Miller.
U.S. Appl. No. 14/067,756, filed Oct. 30, 2013, Daniel T. Cohn.
U.S. Appl. No. 15/061,851, filed Mar. 4, 2016, Eric Jason Brandwine.
U.S. Appl. No. 15/154,818, filed May 13, 2016, Eric Jason Brandwine.

* cited by examiner

SESSION COORDINATION FOR AUTO-SCALED VIRTUALIZED GRAPHICS PROCESSING

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

The advent of virtualization technologies for commodity hardware has provided benefits with respect to managing large-scale computing resources for many clients with diverse needs. For example, virtualization technologies may allow a single physical computing device to be shared among multiple users by providing each user with one or more virtual machines hosted by the single physical computing device. Each such virtual machine may be a software simulation acting as a distinct logical computing system that provides users with the illusion that they are the sole operators and administrators of a given hardware computing resource, while also providing application isolation and security among the various virtual machines. With virtualization, the single physical computing device can create, maintain, or delete virtual machines in a dynamic manner. For some applications implemented using virtual machines, specialized processing devices may be appropriate for some of the computations performed—e.g., some algorithms may require extensive manipulation of graphical data.

Figure 1:
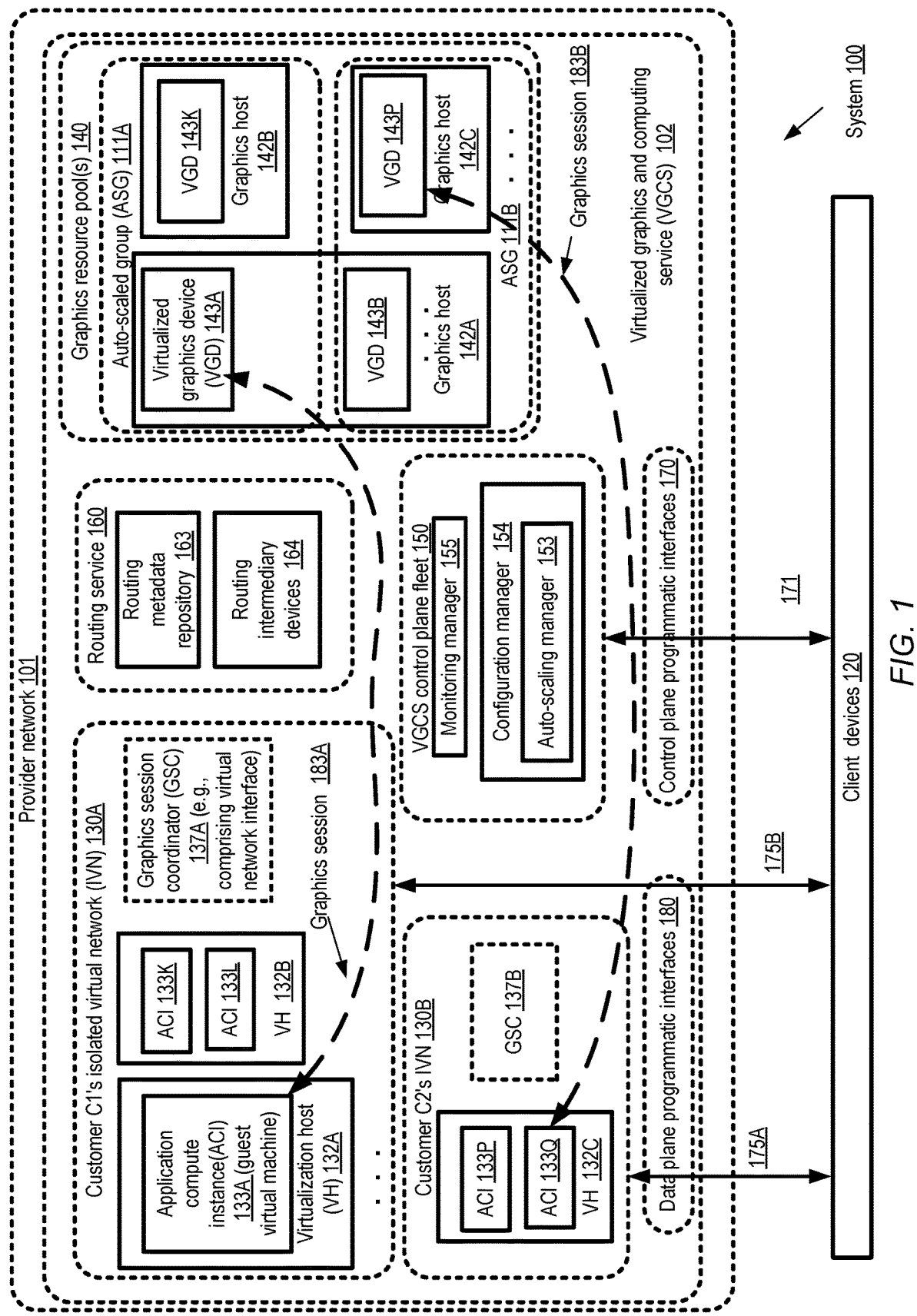
FIG. 1 illustrates an example system environment for virtualizing graphics processing in a provider network, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for managing sessions for graphics operations performed using remote virtualized graphics resources in a scalable policy-driven manner are described. According to one embodiment, a network-accessible virtualized graphics and computing service (VGCS) may implement programmatic interfaces enabling clients to request allocation and instantiation of guest virtual machines which can be used to execute applications. Such guest virtual machines may also be referred to as "application compute instances" in various embodiments. Some of the applications of the clients may include substantial amounts of graphics-related processing—e.g., for game streaming, 3D application streaming, scientific visualizations/simulations, server-side graphics workloads, rendering, financial modeling, and/or engineering design tasks. To serve clients with such applications, in various embodiments the VGCS may configure remote virtualized graphics devices (such as virtual graphics processing units or GPUs) which are available for network access from application compute instances. In at least some embodiments, a VGCS may be implemented at a provider network. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network (and/or a VGCS) may in some cases be distributed across multiple data centers, which in turn may be distributed among numerous geographical regions (e.g., with each region corresponding to one or more cities, states or countries).

The graphics-related workload of a client may change over time in some embodiments, sometimes fairly quickly depending on the kinds of applications being run, making it difficult to predict in advance the precise amount of remote virtualized graphics processing capabilities that may be required at some future time. In various embodiments, the VGCS may implement programmatic interfaces which can be used to request the establishment of auto-scaled groups of remote virtualized graphics devices, such that the VGCS may automatically deploy (or un-deploy) virtualized graphics devices as the graphics requirements of the client change. After an auto-scaled group of graphics resources is established, in various embodiments requests for starting and terminating graphics sessions may be sent to a graphics session coordinator associated with the auto-scaled group, as described below. A respective scaling policy, e.g., defining constraints regarding the maximum and/or minimum numbers of different categories of remote virtualized graphics devices which can be deployed as part of an auto-scaled group, and/or defining provisioning rules to be used to add/remove remote virtualized graphics devices, may be associated with individual ones of the auto-scaled groups in various embodiments. A number of different provisioning modes may be supported for such auto-scaled groups, such as exclusive or reserved provisioning mode, best-effort provisioning mode, and the like, which may impact the manner and timing of allocations of remote virtualized graphics devices, as described below in further detail.

In response to a programmatic request to establish an auto-scaled graphics resource group with an associated scaling policy, in various embodiments the VGCS may establish a graphics session coordinator (GSC) for the requesting client. In at least one embodiment, one or more metadata entries corresponding to the GSC may be stored in a configuration database of the VGCS, including for example an object representing a virtual network interface with one or more network addresses or endpoints. The virtual network interface may be assigned one or more network addresses in some embodiments (e.g., Internet Protocol (IP) version 4 or version 6 addresses), at least some of which may be accessible from the application compute instances from which graphics operation requests are expected. In some embodiments, instead of or in addition to virtual network interfaces, one or more physical network interfaces may be set up for the GSC. After the GSC has been configured, requests for establishing graphics operations sessions may be directed from the individual application compute instances of the client to one or more of the GSC network addresses in various embodiments. In at least some embodiments, a given graphics operation session (which may also be referred to simply as a graphics session) may comprise the transmission of some number of graphics operation requests from an application compute instance (or some other graphics request generator), the execution of the requested operations at one or more remote virtualized graphics devices, and the transmission of some number of responses comprising results of the requested graphics operations from the remote virtualized graphics devices to specified result destinations (where the destinations may in some cases differ from the request generators). In some embodiments, a request for establishing a graphics session may be referred to as a request to programmatically "attach" one or more remote virtualized graphics devices, and a corresponding "detach" request may be used to terminate a session.

If the establishment of a requested session would not violate the scaling policy associated with the set of application compute instances for which the GSC has been set up, the VGCS may cause one or more configuration operations at a routing service or routing layer, such that packets containing graphics operation requests may be directed to one or more remote virtualized graphics devices of the auto-scaled group during the session, and packets containing results of those graphics operations may be directed from the one or more remote virtualized graphics devices to one or more destinations identified for the session. Depending, for example, on the provisioning mode associated with the auto-scaled group, in some embodiments the remote virtualized graphics device(s) for the session may have to be instantiated after the session request is received. In some cases, e.g., when an exclusive or reserved provisioning mode is used, a pool of remote virtualized graphics devices may be established in advance, and one or more of the pre-established devices may be allocated to an approved session in various embodiments. After the graphics operations of a given session are complete, in some embodiments the session may be terminated—e.g., either in response to an explicit termination request, in response to determining that the application compute instance has been terminated, or based on some threshold of inactivity with respect to the remote virtualized graphics device used for the session. In various embodiments, the hardware resources that were used for a remote virtualized graphics device during a given session (or the remote virtualized graphics device itself) may be re-used, e.g., in response to a request for a different session. In at least one embodiment, before re-using graphics resources for a different session, at least a portion of memory and/or storage used for the original session may be overwritten or cleared, so that application state information is not passed from one session to another.

If deploying a remote virtualized graphics device for a requested graphics session would violate the scaling policy in effect, e.g., by exceeding the maximum number of remote virtualized graphics devices permitted by the provisioning rules of the policy, the request may be rejected by the VGCS in at least some embodiments. In at least one embodiment, a message indicating an error and/or a violation of the scaling policy may be delivered to the session requester.

In some embodiments, auto-scaled deployment of graphics resources may be performed at several different levels, including for example a session-initiation level and an intra-session level. Session-initiation level deployment may occur when new sessions are requested in some embodiments—e.g., new virtualized graphics resources may be instantiated and deployed in response to a session establishment request which indicates the types and counts of graphics devices required for the session (or performance requirements of the session, which can be translated into types and counts of graphics devices), as long as the provisioning rules of the scaling policy are not violated. Intra-session level deployment of resources may occur in some embodiments, for example, in response to measurements of usage of the graphics resources deployed during an ongoing session. For example, if two remote virtualized graphics devices are deployed for a given session, and the utilization level of the two devices exceeds a threshold for some time period as the session proceeds, another virtualized graphics device may be deployed for the session without requiring a corresponding request to be sent to the VGCS, and the appropriate routing-related configuration changes may be performed to enable graphics-related packets to flow to and from the added virtualized graphics device. In another example, if four remote virtualized graphics devices are initially deployed for a session, and the average utilization level for the four devices remains below another threshold for some time period, one or more of the devices may be removed or un-deployed, and the appropriate routing changes may be initiated. A number of tools and/or a monitoring service may be employed to keep track of metrics which may be used to make auto-scaling deployment decisions in various embodiments.

In an embodiment in which exclusive provisioning of remote virtualized graphics devices is supported by the VGCS, pools of graphics resources (e.g., hosts comprising one or more graphics processing units or GPUs, or virtualized graphics devices instantiated at such hosts) may be reserved on behalf of respective clients. For example, if an auto-scaled group of up to a hundred remote virtualized graphics devices of a particular category is requested in exclusive provisioning mode, a pool of one hundred such devices may be instantiated and used for subsequent session requests originating at the client's application compute instances in one embodiment. If a best-effort provisioning mode is indicated in an auto-scaling group establishment request, in various embodiments the VGCS may not necessarily reserve the maximum number of virtualized graphics devices from a pool set aside for the client alone; instead, a shared pool of virtualized graphics devices and/or GPU-containing hosts may be used. In some embodiments, multiple sessions may be established using a single remote virtualized graphics device—e.g., graphics requests generated by more than one application compute instance may be fulfilled by a particular remote virtualized graphics device. In other embodiments, a given remote virtualized graphics device may only be used in a single-tenant manner, e.g., to perform graphics operations requested by no more than one application compute instance.

The manner in which destination addresses are specified within graphics operation request packets of a given session may vary in different embodiments. In at least one embodiment, when a session request directed to an endpoint of a graphics session coordinator GSC1 from an application compute instance ACI1 is accepted, connection parameters comprising a destination IP address VGD-IPAddr assigned to a particular remote virtualized graphics device may be provided to ACI1. Subsequent request packets may indicate the VGD-IPAddr as the destination address in such embodiments. In another embodiment, instead of using an IP address assigned to a virtualized graphics device, an address of the graphics session coordinator GSC1 itself may be used as the destination address for packets containing graphics operation requests during the session, and routing components of the system may translate the GSC1 address to the address of a virtualized graphics device selected for the session. Analogous addressing schemes may be used for the packet containing results of the requested graphics operations in various embodiments —e.g., either an address specific to a graphics request generator such as an ACI may be indicated as the destination IP address during a session, or an address of the graphics session coordinator may be indicated as the destination address. The terms "graphics-related traffic", "graphics-processing related traffic", and "graphics virtualization-related traffic" may be used interchangeably to refer to the network packets containing graphics operation requests and to network packets containing results of the requested operations with respect to at least some embodiments.

In at least one embodiment, a graphics session coordinator may have multiple IP addresses associated with it, including zero or more private IP addresses which are not advertised outside the provider network at which the VGCS is implemented, and/or zero or more public IP addresses which are advertised outside the provider network. In some embodiments, the ability to request and utilize graphics sessions may not be restricted to application compute instances located within the VGCS itself. For example, in some embodiments, graphics sessions which utilize virtualized graphics devices of the VGCS may be established from hosts within a client-owned network external to the provider network, and/or from hosts outside the provider network that are connected to the public portion of the Internet. In some such embodiments, the provider network may in effect implement a publicly-accessible graphics operation service, in which applications running on various device connected to the Internet can have their graphics processing performed in an automatically scaled manner using the provider network's resources. The hosts, devices or applications outside the provider network from which graphics operations requests are received and processed at the provider network may be referred to as "external" graphics request generators in various embodiments, e.g., in contrast to the application compute instances which may be considered "internal" graphics request generators from the provider network perspective. In at least one embodiment, a graphics session coordinator established for external graphics request generators may be configured with at least one public IP address accessible from the external graphics request generators.

In some embodiments, a graphics driver or shim, for example provided by or downloaded from the VGCS, may be installed locally at the external hosts from which graphics operation requests originate. Similar drivers or shims may be used at application compute instances as well in various embodiments. Such a graphics driver may, for example, be configured to instantiate a local or "client-side" cache at which some results of graphics requests can be stored for re-use, thereby potentially reducing the amount of graphics-related network traffic required for a given application.

In at least some embodiments, a graphics session coordinator may be set up to provide an address or endpoint for requesting graphics sessions in general, and may not necessarily be tied to a particular auto-scaled resource group or a scaling policy. For example, in one embodiment, a graphics session coordinator may be established in response to a determination that remote virtualized graphics processing is to be enabled for a set of graphics request generators, without enforcing client-specified auto-scaling requirements or rules. Such a general-purpose graphics session coordinator may be used in various embodiments to set up and tear down graphics sessions in response to respective types of requests from graphics request generators.

In various embodiments, multiple types or categories of remote virtualized graphics devices may be supported at a VGCS; such categories may differ from one another along various dimensions such as performance, vendor type and so on. In one embodiment, a client may choose a virtualized graphics device type from several supported classes of virtualized graphics devices, and submit a request for a graphics session in which one or more instances of the selected virtualized graphics device type are made accessible to a specified application compute instance or graphics request generator. The classes of remote virtualized graphics devices which can be used for a given session may be indicated in the scaling policy associated with the auto-scaled group being used in some embodiments.

In one embodiment, respective isolated virtual networks (IVNs) may be established on behalf of various clients at the VGCS. An isolated virtual network may comprise a collection of networked resources (including, for example, application compute instances) allocated to a given client, which are logically isolated from (and by default, inaccessible from) resources allocated for other clients in other isolated virtual networks. The client on whose behalf an IVN is established may be granted substantial flexibility regarding network configuration for the resources of the IVN—e.g., private IP addresses for application compute instances may be selected by the client without having to consider the possibility that other resources within other IVNs may have been assigned the same IP addresses, subnets of the client's choice may be established within the IVN, security rules may be set up by the client for incoming and outgoing traffic with respect to the IVN, and so on. Isolated virtual networks may be used by the control plane or administrative components of the VGCS itself for various purposes in some embodiments—e.g., in one embodiment, a set of virtualized graphics devices may be configured within an IVN. In one embodiment in which an IVN with a range of private addresses (e.g., IP version 4 or IP version 6 addresses) is set up on behalf of VGCS clients, a virtual network interface with one or more of the private addresses may be established for a graphics session coordinator (GSC) of the client. As a result, in such an embodiment, only application compute instances within the IVN may be able to offload their graphics processing to remote virtualized graphics devices using sessions established via the GSC. Virtual network interfaces may also be referred to as elastic network interfaces in some embodiments. In at least one embodiment, when a GSC is set up within an IVN, e.g., in response to a programmatic request directed to the control plane of the VGCS, the DNS (Domain Name System) configuration information associated with that IVN may be updated to include one or more IP addresses of the GSC. After the DNS configuration is updated, application compute instances may be able to obtain the GSC's IP address(es) via DNS requests, and use the IP address(es) to submit graphics session requests in such embodiments. In other embodiments, DNS may not necessarily be used as the mechanism for advertising GSC network addresses.

Any of a variety of networking protocols may be used for the graphics related traffic in different embodiments. For example, a Transmission Control Protocol (TCP) connection may be established between the application compute instance and one or more remote virtualized graphics devices in some embodiments. Other protocols may be used in other embodiments.

Example System Environment

FIG. 1 illustrates an example system environment for virtualizing graphics processing in a provider network, according to one embodiment. As shown, system 100 comprises a provider network 101 in which a virtualized graphics and computing service (VGCS) 102 is implemented. The VGCS 102 may include, among other resources, a control plane fleet 150, one or more isolated virtual networks (IVNs) such as IVN 130A and IVN 130B established on behalf of respective clients or customers of the VGCS, one or more graphics resource pools 140, and a routing service 160 in the depicted embodiment. The VGCS may implement a number of programmatic interfaces in the depicted embodiment, including control plane programmatic interfaces 170 and data plane programmatic interfaces 180. The control plane programmatic interfaces 170 may be used, for example, to transmit administrative requests from client devices 120 to the VGCS as indicated by arrow 171, such as requests to establish auto-scaled groups 111 (e.g., auto-scaled groups 111A or 111B) of virtualized graphics resources to which graphics sessions 183 may be established, to change scaling policies associated with the auto-scaled groups, to instantiate or launch application compute instances 133, to pause or terminate the application compute instances, to view monitoring information, and so on. The data plane programmatic interfaces 180 may be used from client devices to access allocated application compute instances 133 as indicated by arrow 175, e.g., to initiate/terminate various applications, inspect application data, and so on. Any of a variety of interfaces may be used for the control plane and/or data plane interactions between the clients and the VGCS in different embodiments, such as web-based consoles, application programming interfaces (APIs), command line tools, graphical user interfaces and the like. A client device 120 may, for example, comprise any computing device (such as a laptop or desktop computer or host, a tablet computer, a smart phone or the like) from which such interfaces may be utilized or invoked in various embodiments.

In the depicted embodiment, isolated virtual network (IVN) 130A has been established for a particular customer C1, and comprises at least four application compute instances 133A, 133K and 133L. Each of the application compute instances 133 may comprise a respective guest virtual machine running on a virtualization host 132. For example, virtualization host 132A comprises application compute instances 133A, while virtualization host 132B comprises application compute instances 133K and 133L. Similarly, IVN 130B has been established for customer C2, and comprises at least application compute instances 133P and 133Q at virtualization host 132C. In various embodiments, a configuration request to enable the use of an auto-scaled group of remote virtualized graphics resources for various application compute instances of an IVN may be submitted to the VGCS control plane. Such a configuration request may also be referred to as an auto-scaled graphics resource group request, or an auto-scaled group request in various embodiments. An auto-scaled group request may indicate a scaling policy to be applied for the graphics resources being requested in at least some embodiments, comprising one or more provisioning rules indicating limits on the number and/or type of graphics resources to be deployed as part of the auto-scaled group, as well as other desired characteristics of the auto-scaled group.

In response to receiving such a request or otherwise determining that automated scaling of remote virtualized graphics resources is to be enabled on behalf of one or more application compute instances 133 of an IVN 130, one or more computing devices of the VGCS control plane 150 may establish a graphics session coordinator 137 within the IVN. For example, graphics session coordinator (GSC) 137A associated with auto-scaling group 111A has been established within IVN 130A for application compute instances of IVN 130A, and GSC 137B associated with auto-scaling group 111B has been established within IVN 130B in the depicted embodiment. In some embodiments, a 1:N relationship may exist between GSCs 137 and auto-scaled groups 111—e.g., a given GSC may be used to establish graphics sessions with multiple auto-scaled groups. In other embodiments, a 1:1 relationship may exist between GSCs and auto-scaled groups, or an N:1 relationship may exist, in which multiple GSCs may be used to establish sessions with virtualized graphics devices of a single auto-scaled group. Metadata indicating the particular auto-scaled group(s) 111 associated with a given GSC 137 may be stored at the VGCS control plane in at least some embodiments. In some embodiments, at a customer's request, a plurality of GSCs 137 may be established within a given IVN, e.g., with each GSC intended to be used by a respective subset of the IVN's application compute instances. In one such embodiment, for example, multiple GSCs may be set up so that the graphics-related traffic of a first group of application compute instance (which may be running a particular type of graphics application) is isolated from the graphics-related traffic of a second subset of application compute instances (which may be running a different type of graphics application).

A given graphics session coordinator 137, which may be represented by a set of metadata stored within a configuration database of the VGCS control plane and may be implemented using one or more computing devices, may provide an easy-to-access network endpoint enabling graphics sessions, such as session 183A or 183B, to be established on behalf of various application compute instances 133 in the depicted embodiment. In at least some embodiments, one or more virtual network interfaces may be established for each graphics session coordinator, and one or more network addresses or endpoints assigned to such a virtual network interface may be used to request graphics sessions from the application compute instances. Such a virtual network interface may be referred to as a graphics session coordination interface in at least some embodiments, and/or the corresponding endpoints may be referred to as graphics session coordination endpoints. In at least one embodiment, a given graphics session coordination interface may be assigned multiple IP addresses. In some such embodiments, from among multiple IP addresses, respective IP addresses may be designated for use by respective groups of application compute instances to establish graphics sessions. In other embodiments, any of the IP addresses may be used by any of the application compute instances for graphics sessions. In one embodiment, additional IP addresses and/or addition virtual network interfaces may be established for graphics session management on behalf of a given set of application compute instances (or a set of other graphics request generators) over time, e.g., in response to detection of changing workloads by the VGCS control plane and/or in response to requests from VGCS clients. As mentioned above, in at least some embodiments the graphics session coordinators' network addresses, which are to be used to request graphics sessions, may be provided to various types of graphics request generators (including application compute instances) in response to DNS queries. In various embodiments, a GSC 137 may provide a secure, flexible mechanism for sharing a collection of auto-scaled graphics resources such as virtualized graphics devices 143 among a set of application compute instances 133. As a result of the establishment of GSCs, a customer may be able to avoid having to request virtualized graphics resources for application compute instances on a per-instance basis in at least some embodiments. Furthermore, in at least some embodiments, after setting the scaling policy associated with a given auto-scaled group, customers may not have to keep track of changing graphics requirements and associated potentially changing billing costs, thereby considerably simplifying the task of running graphics-intensive applications in a cost-effective manner.

A request for a new graphics session 183, e.g., comprising some indication of the remote graphics processing performance needed, or the amount or type of remote virtualized graphics resources needed, may be sent from an application compute instance 133 of an IVN 130 to a GSC 137 established within the IVN in the depicted embodiment. Such a session setup request may be directed to a private IP address assigned to the GSC 137 in various embodiments; that is, the address may not be accessible from outside the IVN. The request may be analyzed to determine whether fulfilling it would lead to a violation of one or more rules indicated in a particular scaling policy associated with the GSC 137. For example, if provisioning and/or deploying an additional virtualized graphics device 143 would violate a threshold for the maximum permitted number of virtualized graphics devices of the auto-scaling group 111, the request may be rejected in various embodiments. A message indicating the cause of the rejection may be transmitted to the requesting application compute instance in at least some embodiments. If provisioning and/or deploying the resources indicated in the session request would not violate any of the provisioning rules in the applicable scaling policy, in at least some embodiments the request may be approved and one or more remote virtualized graphics devices 143, such as 143A for session 183A or 143P for session 183B may be selected for the session. Connection parameters (such as destination addresses to be used for network packets comprising graphics operation requests) for the approved session may be identified at the VGCS control plane and transmitted to the requesting application compute instance 133 in the depicted embodiment. In addition, one or more configuration operations may be initiated or performed at the routing service 160 by the VGCS control plane to enable the graphics operation requests to be directed from the application compute instance 133 for which the session has been established to the appropriate remote virtualized graphics device 143 in some embodiments. Similarly, in such embodiments, configuration operations at the routing service 160 may be performed to enable packets containing results of the graphics operations to be directed from the remote virtualized graphics device to the appropriate destination (e.g., the requesting application compute instance and/or some other destination indicated in the session request). The routing-related configuration operations may include, for example, generating one or more routing mappings or entries, storing such entries in metadata repository 163 and/or propagating the entries to one or more routers or intermediary devices 164 in the depicted embodiment.

In some embodiments, an auto-scaling manager component 153 of the VGCS control plane may be responsible for determining whether sufficient unused resources are available in the graphics resource pool(s) 140 for setting up requested auto-scaling groups, for identifying the specific resources within the pools 140 that are to be used for a given auto-scaling group 111 and/or for specific sessions 183, and so on. In at least one embodiment, the auto-scaling manager 153 may be implemented as a subcomponent of a configuration manager 154, which may for example be responsible for other types of configuration operations in addition to auto-scaling of graphics devices. In some embodiments, depending for example on the provisioning mode indicated in a request to establish an auto-scaling group, an initial number of virtualized graphics devices may be instantiated within an auto-scaling group 111 prior to the receipt of any session requests from the application compute instances for which the group is established. In at least some embodiments, at least some of the application compute instances for which an auto-scaling group 111 is being requested and created may not have been set up at the time that the auto-scaling group request is submitted—e.g. application compute instance 133A may be instantiated after auto-scaling group 111A and/or GSC 137A is set up. A monitoring manager 155 in the VGCS control plane may be responsible in the depicted embodiment for collecting various performance metrics (such as utilization levels for GPUs, CPUs, memory, networking resources and the like) which can be used to make auto-scaling decisions and/or to provide insights to clients regarding the performance of their graphics applications. In at least one embodiment, metrics indicative of the connectivity between application compute instances 133 and the remote virtualized graphics devices 143 of various sessions 183, as well as the health status of the compute instances and the virtualized graphics devices themselves, may also be collected and/or provided to customers programmatically.

In at least one embodiment, routing metadata including, for example, mappings between a source network address, a source port, an application compute instance, and the remote virtualized graphics device(s) to be used for a given session may be sent to the isolated virtual network and to the graphics resource pool 140, in addition to being sent to the routing service 160. In one embodiment, the mappings may be provided to one or more of the endpoint entities involved in the graphics traffic—the application compute instance 133 and the remote virtualized graphics device(s) 143 to which the application compute instance is connected during a session. Using the mapping, the application compute instances and/or the remote virtualized graphics devices may be able to verify that graphics-related network packets or messages that they have received are from the appropriate authorized endpoints in various embodiments, thereby enhancing application security. In one embodiment, for example, prior to performing graphics processing operations indicated in a received request, a remote virtualized graphics device 143 may use the mapping to validate that the request originated at an acceptable or expected application compute instance. In another embodiment, before accepting results of graphics processing included in a received message, an application compute instance 133 may use the mapping to validate that the message originated at a virtualized graphics device to which the corresponding request was directed.

In one embodiment, the VGCS 102 may offer application compute instances 133 with varying computational and/or memory resources. In one embodiment, each of the application compute instances 133 may correspond to one of several instance types. An instance type may be characterized by its computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality of the VGCS 102, an instance type may be selected for a client, e.g., based (at least in part) on input from the client. For example, a client may choose an instance type from a predefined set of instance types. As another example, a client may specify the desired resources of an instance type, and the VGCS control plane may select an instance type based on such a specification.

In one embodiment, as indicated earlier, the VGCS 102 may offer virtualized graphics devices 143 with varying graphics processing capabilities. In one embodiment, each of the virtualized graphics devices 143 may correspond to one of several virtual GPU classes. A virtual GPU class may be characterized by its computational resources for graphics processing, memory resources for graphics processing, and/or other suitable descriptive characteristics. In one embodiment, the virtual GPU classes may represent subdivisions of graphics processing capabilities of a physical GPU, such as a full GPU, a half GPU, a quarter GPU, and so on. The scaling policies associated with auto-scaling groups 111 may indicate the virtual GPU classes to be used in various embodiments.

In at least one embodiment, the resources of a given virtualization host and/or a given graphics host may be used in a multi-tenant fashion—e.g., application compute instances of more than one client may be established at a given virtualization host, or virtualized graphics devices for more than one client may be established at a given graphics host. In other embodiments, a single-tenant approach may be used with respect to at least some virtualization hosts and/or at least some graphics hosts—e.g., application compute instances of no more than one client may be instantiated on a given virtualization host, and virtualized graphics devices of no more than one client may be instantiated on a given graphics host.

Figure 2:
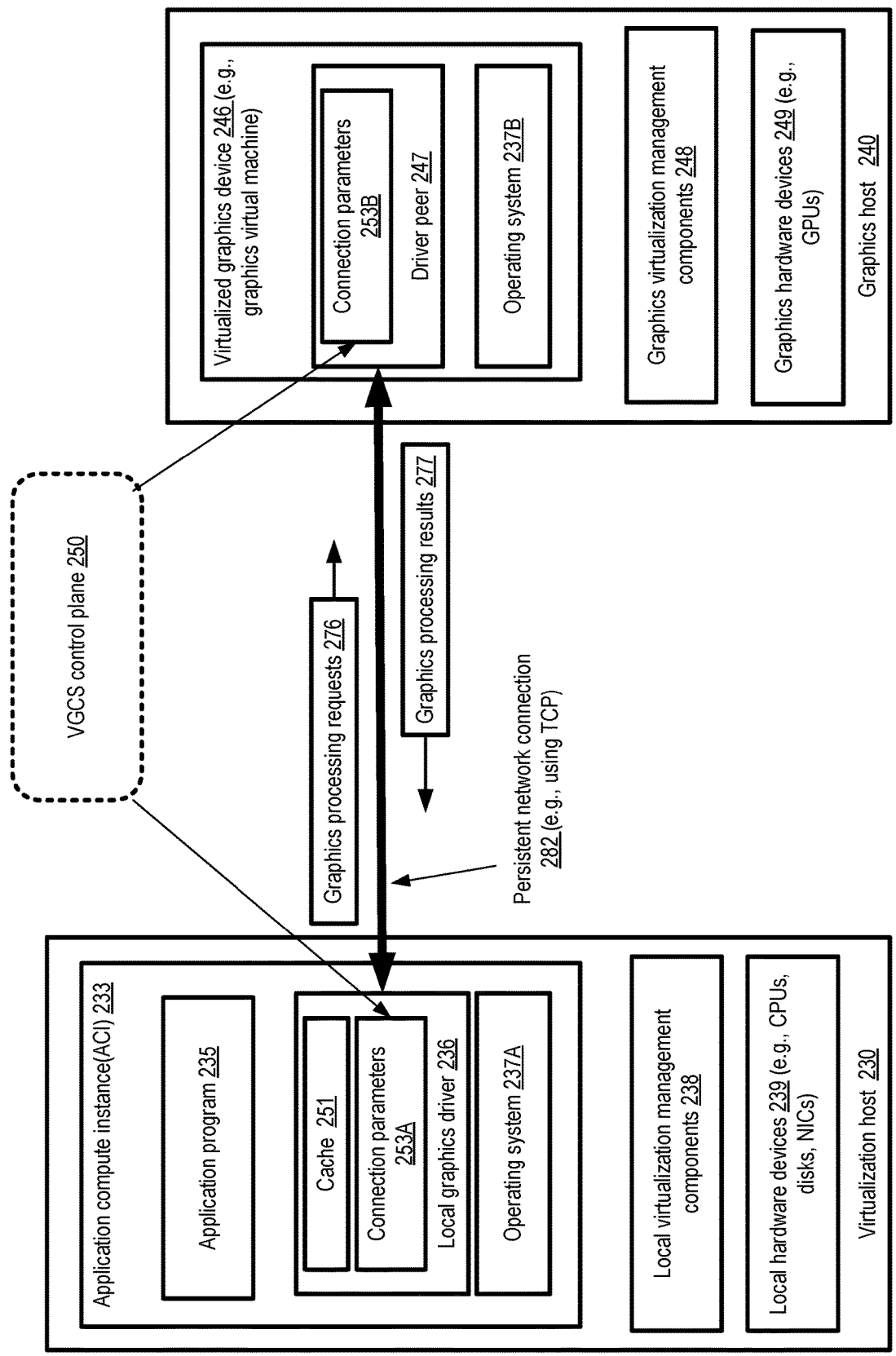
FIG. 2 illustrates example components of virtualization hosts and graphics hosts which may be used for virtualizing graphics processing, according to at least some embodiments.

FIG. 2 illustrates example components of virtualization hosts and graphics hosts which may be used for virtualizing graphics processing, according to at least some embodiments. As shown, a virtualization host 230 may comprise a set of local hardware devices 239, local virtualization management components 238, and one or more application compute instances 233 in the depicted embodiment. A graphics host 240 may comprise one or more graphic hardware devices 249 (e.g., including graphics processing units or GPUs), graphics virtualization management components 248, and one or more virtualized graphics devices 246 in the depicted embodiment. The respective virtualization management devices at the virtualization host and the graphics host may be responsible for handling interactions between the hardware devices and the virtual devices implemented at the respective hosts—e.g., the application compute instance(s) and the virtualized graphics device(s). At the virtualization host, for example, the virtualization management components may include a hypervisor, a privileged instance of an operating system, and/or one or more peripheral devices which may be used for handling networking-related virtualization tasks (such as translations between network addresses assigned to a physical Network Interface Card and network addresses of virtual network interfaces) in some embodiments. Analogous virtualization management components may be instantiated at the graphics host 240 in at least some embodiments.

In the depicted embodiment, an application compute instance 233 (e.g., a guest virtual machine instantiated at virtualization host 230) may comprise, among other constituent elements, an application program 235, an operating system 237A and a local graphics driver 236. A virtualized graphics device 246, which may also be referred to as a graphics virtual machine, may comprise an operating system 237B and a driver peer 247 which communicates with the local graphics driver 236 of the application compute instance 233. A persistent network connection 282 may be established (e.g., as part of a procedure to attach the virtualized graphics device 246 to the application compute instance 233 between the local graphics driver 236 and the driver peer 247 in the depicted embodiment. In some embodiments, for example, TCP may be used for the connection. Connection parameters 253A and 253B, such as the network addresses and ports to be used for the connection at either endpoint, may be determined at the VGCS control plane 250 in response to a request for a graphics session, and transmitted to the virtualization host and/or the graphics host in some embodiments. Graphics processing requests 276 may be transmitted over the connection 282 from the local graphics driver 236 to driver peer 247 in the depicted embodiment. From the driver peer 247, corresponding local versions of the graphic processing requests may be transmitted to the graphics hardware devices 249, and the results 277 obtained from the graphics hardware devices 249 may be transmitted back to the virtualization host via connection 282. The local graphics driver 236 may interact with the virtualized graphics device 246 to provide various types of graphics processing operations for application program 235 in the depicted embodiment, including accelerated two-dimensional graphics processing and/or accelerated three-dimensional graphics processing. In one embodiment, the local graphics driver 236 may implement a graphics application programming interface (API) such as Direct3D or OpenGL. In the depicted embodiment, the local graphics driver 236 may comprise components running in user mode and/or kernel mode. Additional components (not shown), such as a graphics runtime, may also be used to provide accelerated graphics processing on the application compute instance 233 in some embodiments.

In various embodiments, portions of graphics operation results 277 may be stored at least temporarily in a client-side cache 251 accessible from (or part of) the local graphics driver. The client-side cache 251 may be used, for example, to satisfy some types of graphics operation requests of the applications 235 locally at the virtualization host 230 in the depicted embodiment, e.g., without directing a corresponding graphics operation request packet to the remote virtualized graphics device. As a result of using locally-cached results, in various embodiments the overall performance of graphics operations may be improved and the amount of graphics-related network traffic may be reduced.

The layers of the software/hardware stack at which a network connection is established and maintained between the virtualization host and the graphics host may differ in different embodiments. For example, in one embodiment, a process or thread in the operating system layer 237A of the application compute instance may establish a persistent network connection with a peer process or thread in the operating system layer 237B of the virtualized graphics device 246. In another embodiment, a respective persistent network connection may be established between the virtualization management components of the virtualization host and the graphics host(s) for individual application compute instances. In some embodiments, persistent connectivity for graphics-related traffic may be established at a layer that lies below the virtualization management components at each host, and above the respective hardware devices at each host. In at least one embodiment, instead of transmitting the results of a requested graphics operation back to the requesting application compute instance, a remote virtualized graphics device 246 may transmit the results to some other destination indicated in the session setup request and/or in the graphics operation request.

Graphics Sessions from Outside a Provider Network

Figure 3:
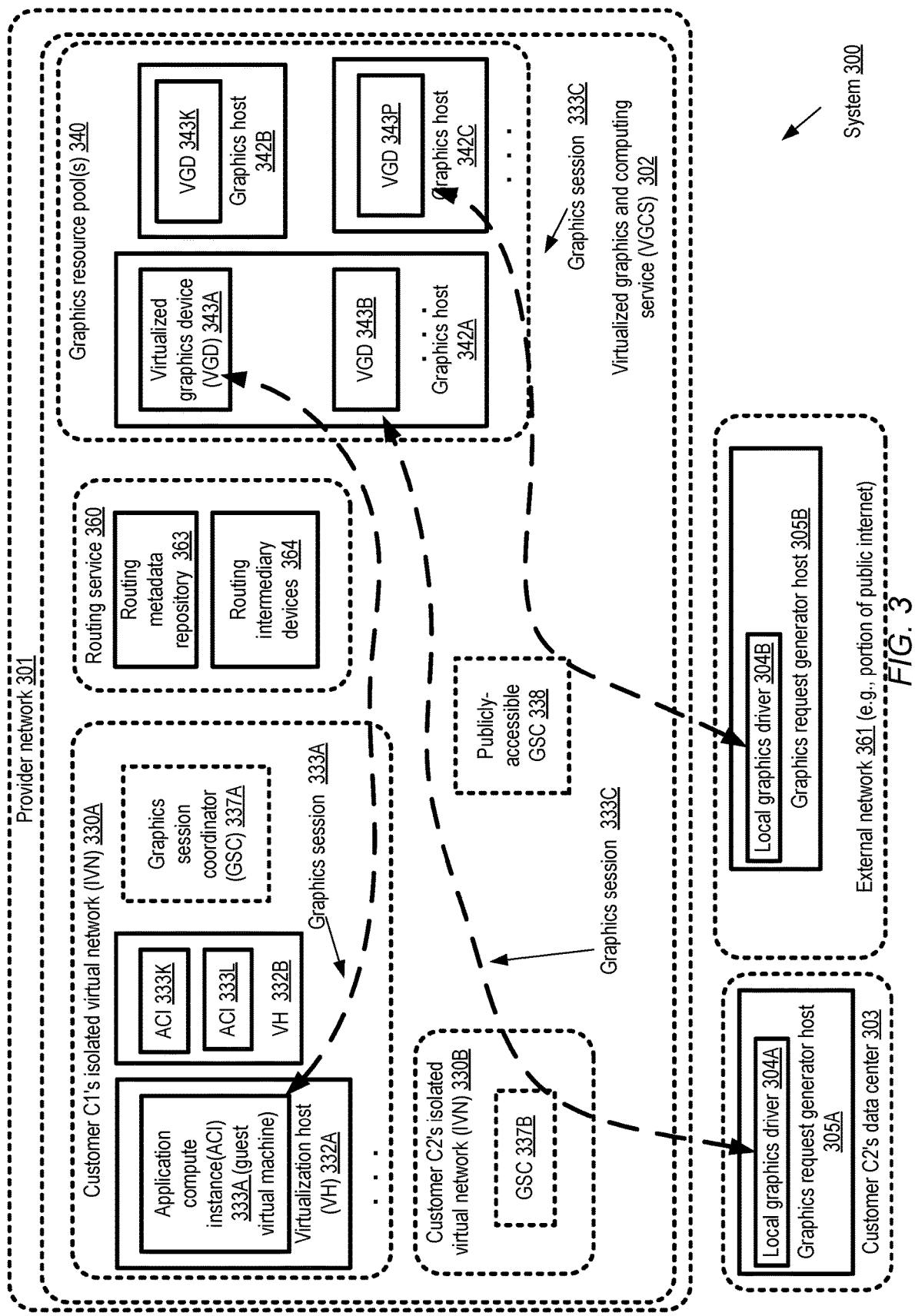
FIG. 3 illustrates an example system environment in which auto-scaled virtualized graphics operations may be configured at a provider network for graphics request generators external to a provider network, according to at least some embodiments.

As mentioned earlier, application compute instances set up within the VGCS may represent one category of graphics request generators for which remote virtualized graphics processing may be enabled. FIG. 3 illustrates an example system environment in which auto-scaled virtualized graphics operations may be configured at a provider network for graphics request generators external to a provider network, according to at least some embodiments. In system 300, provider network 301 may comprise a VGCS 302 which supports auto-scaled remote virtualized graphics processing for at least three categories of graphics request generators in the depicted embodiment: application compute instances such as ACI 333A instantiated within the VGCS itself, graphics request generator hosts such as 305A located within client-owned premises such as customer C2's data center 303, and graphics request generator hosts such as 305B located within other external networks 361 such as a portion of the public Internet. The VGCS may comprise one or more graphics resource pools 340, each comprising some number of remote virtualized graphics devices 343 (e.g., 343A, 343B, 343K and 343P) running on graphics hosts 342 (e.g., 342A, 342B and 342C). To avoid clutter, the control plane fleet of VGCS 302, which may comprise a number of components similar to those shown in the VGCS control plane fleet 150 of FIG. 1, is not shown in FIG. 3.

As in the case of provider network 101 shown in FIG. 1, provider network 301 may also comprise one or more isolated virtual networks (IVNs) such as IVN 330A and IVN 330B. A given IVN 130 may comprise zero or more application compute instances at a given point in time—e.g., ACIs 333A, 333K, and 333L may be instantiated at virtualization hosts 332A, 332B and 332C respectively within IVN 330A. A graphics session coordinator (GSC) 337A may be established within IVN 330A in the depicted embodiment to enable graphics sessions such as session 333A to be set up between application compute instances such as 333A and remote virtualized graphics devices such as VGD 343A identified from graphics resource pools 340. During such a session, network packets comprising graphics operation requests generated at the application compute instance may be transmitted to the remote virtualized graphics device as discussed earlier, and response packets comprising results of such operations may be transmitted to the application compute instance (or a specified results destination) in the depicted embodiment.

In response to a configuration request, a GSC 337B to be used for graphics sessions with devices in customer C2's data center may be set up within IVN 330B in the depicted embodiment. A scaling policy indicating various rules to be used to respond to session requests from data center 303 and/or to changes in metrics pertaining to graphics processing operations being requested from data center 303 may be indicated for an auto-scaling group of graphics resources associated with GSC 337B in the depicted embodiment. An IP address assigned to GSC 337B may be accessed from data center 303 using a variety of connectivity options in different embodiments—for example, via a secure VPN (virtual private network) connection set up on behalf of customer C2, or using dedicated physical network links sometimes referred to as Direct Connect links, and/or via paths that include portions of the public Internet. In a manner similar to that described above with respect to session requests originating at application compute instances, graphics session requests may be sent from graphics request generator host 305A located at an external data center 303 to GSC 337B. In response to such a session request, the VGCS control plane may determine whether provisioning and/or allocating the virtualized graphics device(s) requested for the session would violate the scaling policy. If the policy would not be violated, one or more VGDs such as VGD 343B may be selected from a graphics resource pool 340 for the session 333B in the depicted embodiment. In addition, configuration operations to enable the flow of graphics operation requests from graphics request generator host 305A to the selected VGD(s) and to enable the flow of results of the graphics operations to specified destinations may be initiated or performed, e.g., by transmitting and propagating the appropriate metadata to routing service 360. At the routing service 360, the generated metadata may be stored in repository 363 and/or propagated to the routing devices 364 in the depicted embodiment. By establishing the GSC 337B within an IVN, it may be possible to restrict access to graphics resources to a set of graphics request generators selected by customer C2 in the depicted embodiment, since the IP address(es) assigned to GSC 337B may be chosen by C2.

In at least one embodiment, one or more publicly-accessible graphics session coordinators such as GSC 338 may be established by the VGCS control plane to enable graphics operation requests from external networks to be fulfilled using graphics resource pools 340. A public IP address which is advertised outside provider network 301 may be set up for GSC 338, and a scaling policy may be designated for an auto-scaled group set up for external graphics request generators in the depicted embodiment. In response to a request directed to GSC 338 for a graphics session from a graphics request generator host 305B at an external network 361, the VGCS control plane may apply the rules of the scaling policy designated for the auto-scaled group established for such sessions. A particular virtualized graphics resource such as VGD 343P at graphics host 342C may be deployed for the requested session 333C in the depicted embodiment, and the routing-related configuration operations required for session 333C's traffic may be performed.

In the depicted embodiment, respective local graphics drivers 304A and 304B may be installed at the external graphics request generator hosts 305A and 305B to enable the use of the VGCS remote virtualized graphics capabilities. Client-side caches (similar to cache 251 of FIG. 2) may be used in some embodiments to store and potentially re-use results of graphics operations at request generator hosts 305, thereby reducing the amount of graphics-related traffic required and improving overall graphics application performance. In some embodiments, instead of requiring local graphics drivers to be installed at the external request generators, the applications running at external request generators may be required to utilize a set of graphics-related application programming interfaces (APIs) advertised by or approved by the VGCS. It is noted that at least in one embodiment, an auto-scaling group with specific rules may not explicitly be established for supporting graphics sessions with external graphics request generators such as host 305B. Instead, a pool of graphics resources may be set up for such externally-requested graphics sessions, and resources from that pool may be allocated in response to session requests until the resources are exhausted. When graphics sessions are terminated, the corresponding resources may be returned to the pool, and new session establishment may be resumed.

Example Programmatic Interactions

Figure 4:
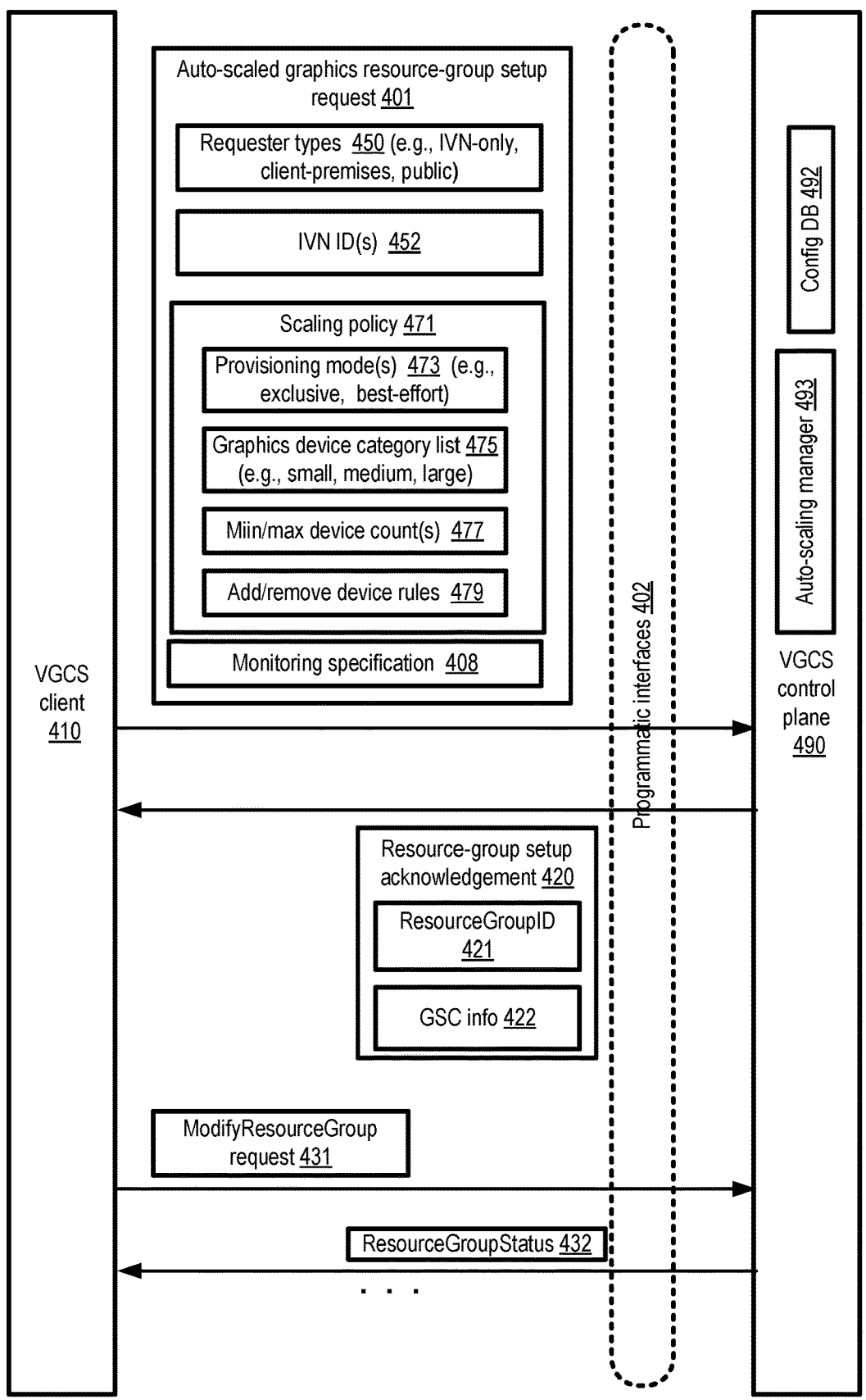
FIG. 4 illustrates example programmatic interactions which may be used to establish or modify an auto-scaled virtualized graphics resource group, according to at least some embodiments.

FIG. 4 illustrates example programmatic interactions which may be used to establish or modify an auto-scaled virtualized graphics resource group, according to at least some embodiments. As shown, a VGCS client 410 may submit an auto-scaled graphics resource group setup request 401 to the VGCS control plane 490 via a programmatic interface 402 in the depicted embodiment. A variety of programmatic interfaces such as web-based consoles, APIs, graphical user interfaces, and/or command-line tools may be used in various embodiments. In the depicted embodiment, the setup request 401 may comprise, among other elements, a requester types list 450, one or more identifier(s) 452 of respective isolated virtual networks, a scaling policy 471 and a monitoring specification 408. The requester types list 450 may indicate whether the auto-scaled group of graphics resources is intended to be utilized for graphics request generators within IVN(s) with identifiers 452 whether the graphics requests may be generated at client-premises as discussed in the context of FIG. 3, whether the graphics requests may be generated at external public networks, or whether some combination of such types of requesters are to be supported.

The scaling policy 471 may indicate one or more provisioning modes 473 (such as exclusive provisioning or best-effort provisioning), a graphics device category list 475, minimum/maximum device counts 477 for zero or more of the categories indicated in list 475, and add/remove device rules 479 for zero or more of the categories indicated in list 475 in the depicted embodiment. If an exclusive provisioning mode is indicated in the scaling policy, the VGCS control plane may reserve a pool comprising the requested numbers of devices of various types indicated in category list 475 for exclusive use by the graphics request generators indicated in requester types list 450 in the depicted embodiment. As a result, as long as the maximum number of remote virtualized graphics devices of a given category allocated to the specified types of graphics request generators is not exceeded, requests for sessions requiring additional remote VGDs may succeed. If a best-effort provisioning mode is indicated, in various embodiments the VGCS may not always be able to fulfill a session request even if the corresponding maximum device counts have not yet been exceeded—e.g., there may a small probability that a session request may be rejected due to unavailability of graphics resources in such circumstances, although in most cases the VGCS would be able to fulfill such session requests. In the best-effort provisioning mode, in effect the client may provide a hint regarding the likely range of the number of graphics devices that may be needed, without requesting exclusive reservations in some embodiments. In at least some embodiments, a per-graphics-device billing rate may differ for exclusive provisioning mode from the corresponding billing rate for best-effort provisioning mode.

The add/remove device rules 479 may indicate the logic to be used to decide whether additional virtualized graphics devices are to be added to or deployed for a given session, or whether currently-allocated virtualized graphics devices are to be removed/un-deployed from a given session in the depicted embodiment. The rules for adding or removing devices may be expressed in terms of monitored metrics in at least some embodiments. Monitoring specification 408 may indicate the kinds of metrics (e.g., GPU utilization, CPU utilization, and the like) which are to be collected for enforcing the add/remove device rules 479. In one embodiment, for example, the add/remove device rules 479 may indicate that if the average GPU utilization for the set of remote virtualized devices currently deployed for a session exceeds X % for some time period T1, an additional virtualized graphics device with G GPUs should be deployed. Similarly, with respect to removing devices, in one embodiment a rule 479 may indicate that if the average GPU utilization for the set of remote virtualized devices currently deployed for a session remains below Y % for some time period T2, and if the number of remote virtualized devices of the session exceeds one, one of the remote virtualized devices should be un-deployed.

A component of the VGCS control plane 490 such as an auto-scaling manager 493 or a configuration manager may determine whether the graphics resource pools of the VGCS and/or associated networking components have sufficient capacity to establish the requested auto-scaled group in the depicted embodiment. If sufficient capacity is available, one or more entries may be added to a configuration database 492 to indicate the creation of the requested auto-scaled group and a corresponding graphics session coordinator. A virtual network interface may be established within a specified IVN for the graphics session coordinator in at least some embodiments, with one or more IP addresses of the virtual network interface being set up to receive session requests. A resource group setup acknowledgement 420 may be sent to the client 410 in some embodiments, comprising an identifier 421 of the auto-scaled resource group and/or information 422 (such as one or more IP addresses) pertaining to the graphics session coordinator to be used for session requests. Subsequently, in at least some embodiments, the client 410 may submit requests 431 to modify the resource group (e.g., by adding one or more graphics session coordinators, changing the types/numbers of VGDs that can be used, and so on). The VGD control plane 490 may make the requested changes if possible, and respond with a resource group status message 432 in the depicted embodiment. Other programmatic interactions regarding auto-scaled groups of graphics resources may also be supported in at least some embodiments, such as requests to display the status of an auto-scaled group (e.g., the count of virtualized graphics devices currently in use, the number of active sessions underway, the history of sessions over some time period, performance statistics, health state, and the like) and so on.

Figure 5:
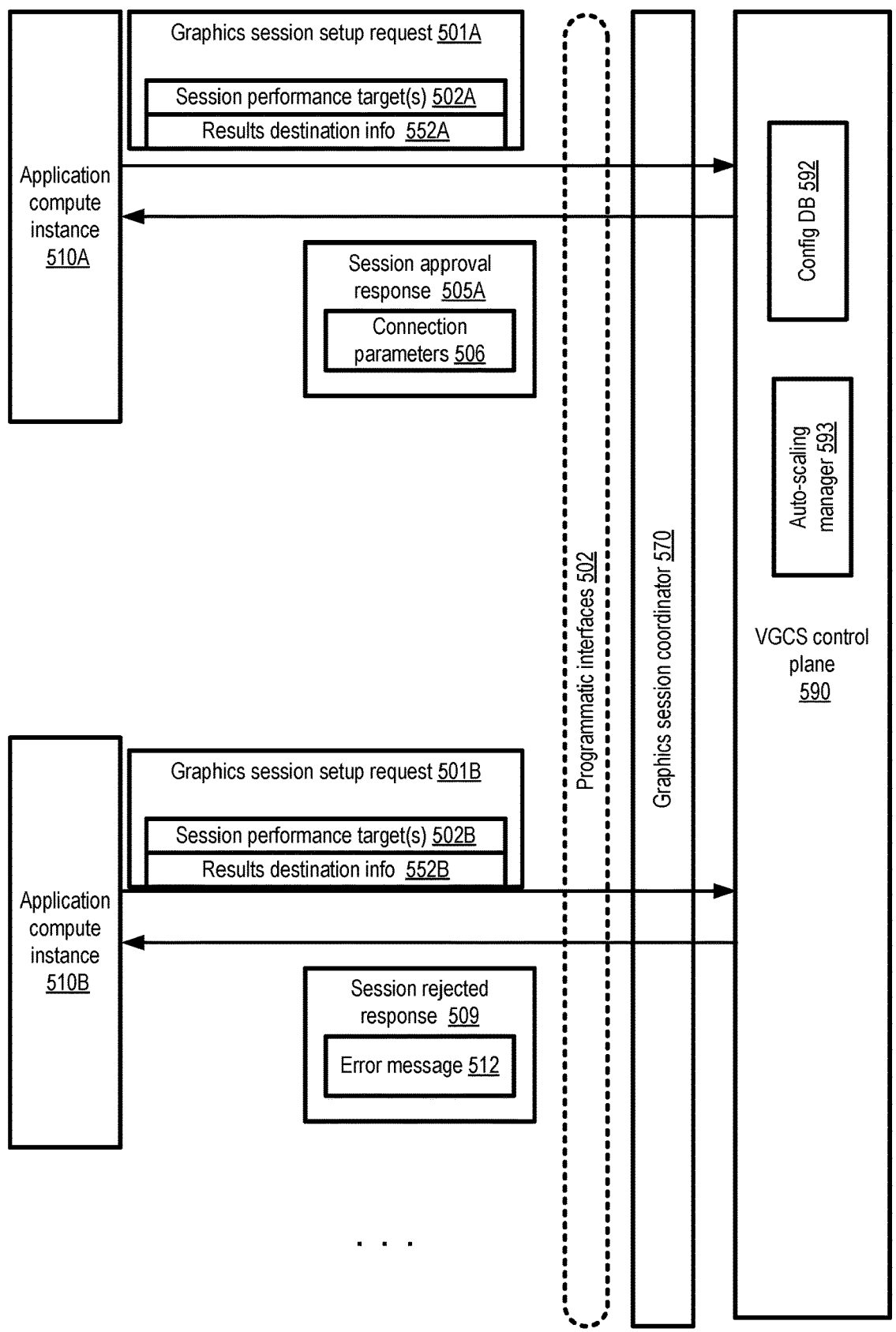
FIG. 5 illustrates example programmatic interactions associated with establishing sessions for virtualized graphics operations, according to at least some embodiments.

FIG. 5 illustrates example programmatic interactions associated with establishing sessions for virtualized graphics operations, according to at least some embodiments. As shown, two application compute instances 510A and 510B may submit respective graphic session setup requests 501A and 501B to an address associated with graphics session coordinator 570 via programmatic interfaces 502. Each of the session setup requests may indicate, for example, a respective performance target 502 (e.g., target 502A or 502B) and/or results destination information 552 (e.g., 552A or 552B).

The performance target 502 for a session may be expressed, for example, in terms of the number of virtualized graphics devices of one or more categories in some embodiments. For example, a VGCS may support three categories of remote virtualized graphics devices, labeled "small", "medium" and "large", which differ from one another in their graphics operation performance capability limits, in one embodiment, and a performance target 502 may indicate the number of devices of one or more types that are being requested for the session. In another embodiment, the performance targets 502 may be expressed in terms of GPUs of a specified type, or in terms of throughput or response time goals with respect to a set of graphics APIs, and the VGCS control plane 590 may translate such targets into the appropriate set of remote virtualized graphics devices of one or more categories. In the depicted embodiment, the results destination information 552 may indicate whether the packets containing results of requested graphics operations are to be sent back to the application compute instance from which the requests were sent, or whether the packets are to be sent to some other specified destination (such as a client device).

In some embodiments, the auto-scaling manager 593 of the VGCS control plane may determine whether the requested resources can be deployed without violating the scaling policy in effect. The scaling policy relevant for a given session request may be identified, for example, based on the identity or source address of the application compute instance 510, the network address of the graphics session coordinator 570 to which the session setup request was sent, or some combination of such factors in different embodiments. If the scaling policy would not be violated and there are sufficient resources available in a graphics resource pool designated for the auto-scaled group associated with the graphics session coordinator 570 and the application compute instance 510A, one or more virtualized graphics devices may be instantiated (unless pre-instantiated virtualized graphics devices are available, as may be the case if the exclusive provisioning mode is being employed) and deployed for the session in the depicted embodiment. Routing-related configuration operations may be initiated by the VGCS control plane as discussed earlier to ensure that packets containing graphics operation requests can be directed from the application compute instance 510A to the deployed virtualized graphics devices, and that the packets containing results of the operations can be directed to the specified results destination indicated in the session setup request 501A. In at least one embodiment, one or more entries pertaining to the approved session may be stored in a configuration database 592 at the VGCS control plane.

A session approval response 505A comprising connection parameters (e.g., a destination IP address to be used for packets containing graphics operation requests) may be generated and sent to application compute instance 510A in the depicted embodiment. The connection parameters may be used by the application compute instance 510A to establish persistent network connections to be used for graphics operation requests and/or responses in various embodiments during the session. Later, e.g., after the graphics-related application being run at application compute instance has completed its graphics operations, a request to terminate the session may be transmitted to the VGCS control plane in the depicted embodiment. In response, the graphics resources that were being used for the session may be freed, so that they may be re-used for some other session if needed. In at least one embodiment, when a session is terminated, the contents of at least a portion of the memory or storage used by the remote virtualized graphics device may be scrubbed or overwritten to ensure that graphics state information of the application that was being executed during the concluded session cannot be accessed during a subsequent session.

The VGCS control plane 590 may determine that session request 501B from application compute instance 510B cannot be fulfilled without violating the applicable scaling rule in the depicted embodiment (e.g., because the maximum permitted number of virtualized graphics devices of the requested type(s) have already been deployed). Consequently, a session rejected response 509 comprising an error message 512 indicating the reason for the rejection may be sent to the application compute instance 510B. It is noted that similar interactions to those shown in FIG. 5 may occur between other types of graphics request generators and the VGCS control plane 590 in various embodiments—e.g., session requests may be generated from hosts located outside the provider network as discussed in the context of FIG. 3.

Addressing Schemes

Figure 6A:
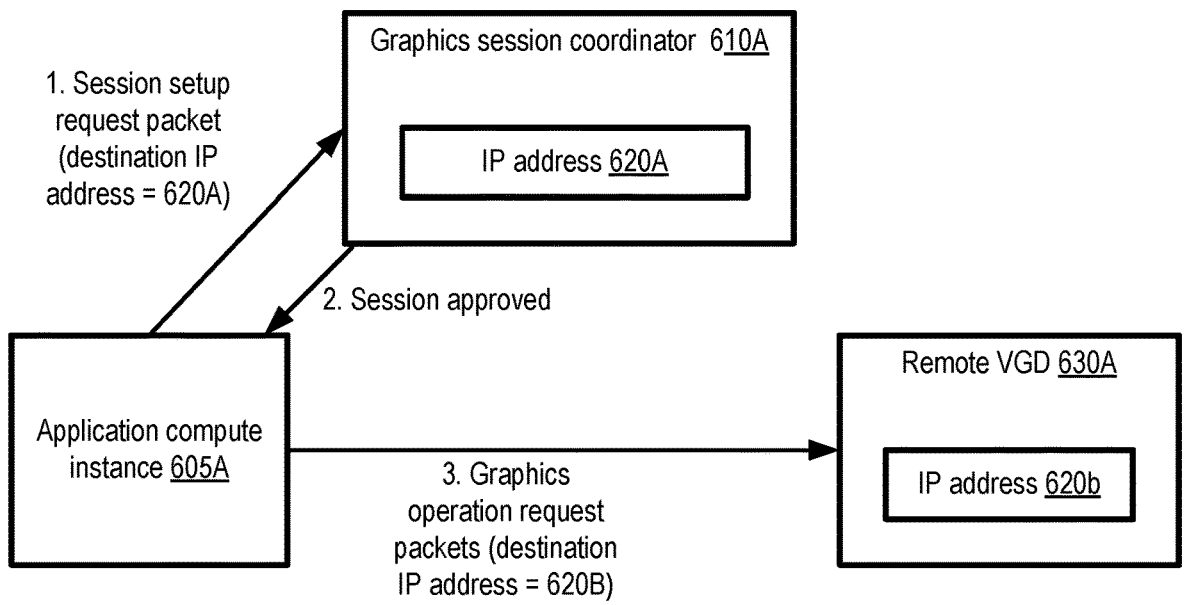
FIG. 6a and FIG. 6b illustrate respective examples of addressing schemes which may be used for packets comprising graphics operation requests, according to at least some embodiments.
Figure 6B:
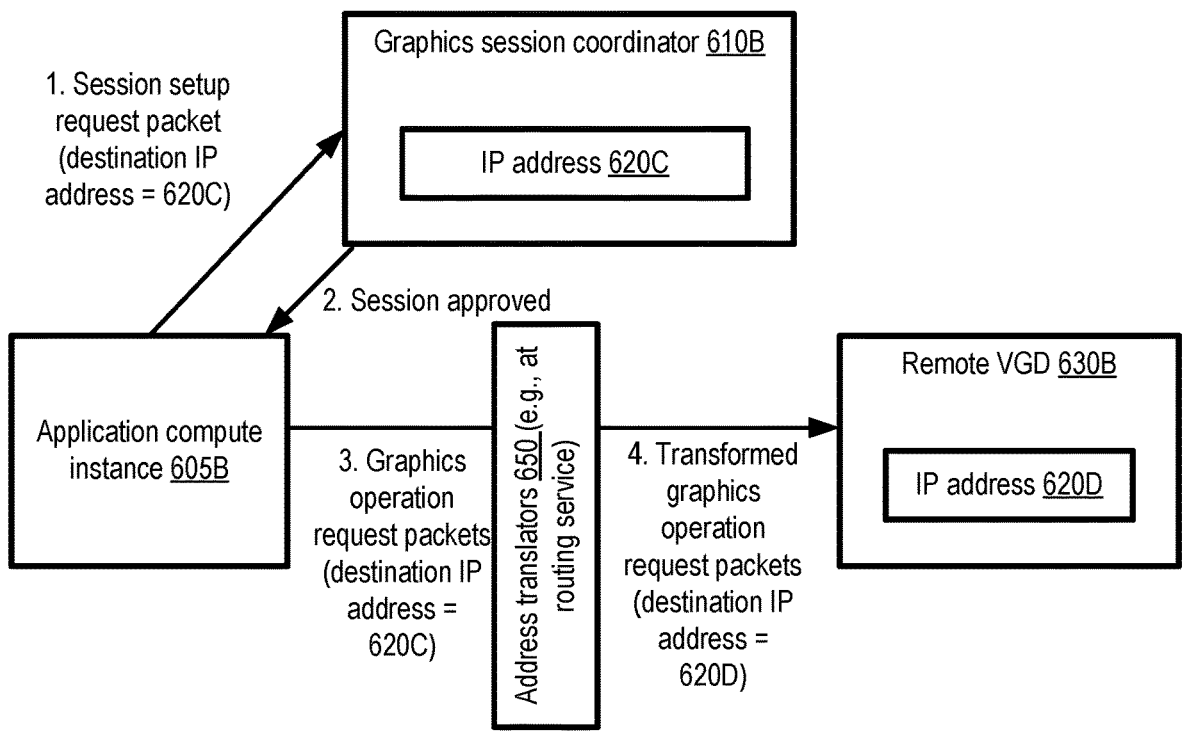

As mentioned earlier, a number of alternative approaches regarding the destination addresses to be used for packets containing graphics operation requests may be taken in different embodiments. FIG. 6a and FIG. 6b illustrate respective examples of addressing schemes which may be used for packets comprising graphics operation requests, according to at least some embodiments. In the embodiment depicted in FIG. 6a, a graphics session coordinator 610A has an IP address 620A, and a remote virtualized graphics device 630A has an IP address 620B. A packet comprising a session setup request is sent from application compute instance 605A with IP address 620A as its destination address, as indicated by the arrow labeled "1". The session may be approved by the graphics session coordinator, as indicated by the arrow labeled "2". The session approval message may indicate connection parameters to be used for the session in the depicted embodiment, including for example the IP address 620B of the remote VGD 630A. Subsequently, as indicated by the arrow labeled "3", packets containing graphics operation requests may indicate the address 620B as their destination. As shown, in the embodiment depicted in FIG. 6a, the graphics session coordinator may act as a distributor or provider of the destination addresses of remote virtualized graphics devices, and those addresses may be used during the graphics sessions by the request generators such as application compute instance 605A.

In the embodiment depicted in FIG. 6b, a session request may also be directed to the IP address 620C of the graphics session coordinator 610B from application compute instance 605B, as indicated by the arrow labeled "1". In the session approval response message indicated by the arrow labeled "2", the connection parameters provided may indicate that the address 620C of the graphics session coordinator 610B is to be used for packets containing graphics operation requests. Subsequently, the application compute instance 605B may generate packets with a destination address 620C for requesting graphics operations, as indicated by label "3". The routing service and/or other networking intermediaries may comprise address translators 650 which transform the packets containing graphics requests to indicate IP address 620D of the virtualized graphics device to be used for the session as their destination, as indicated by the label "4" in the embodiment depicted in FIG. 6b. As shown in FIG. 6b, the IP address 620C of the session coordinator may be used as the destination address for packets associated with at least two types of operations in some embodiments—session establishment, and graphics operations during a session. In effect, details such as the IP addresses of the remote virtualized graphics devices may not be provided to the application compute instances or other graphics request generators in such embodiments, and the required address translations or transformations for routing the graphics operation requests may be performed automatically by the VGCS and/or the routing service.

Intra-Session Auto-Scaling Operations

Figure 7A:
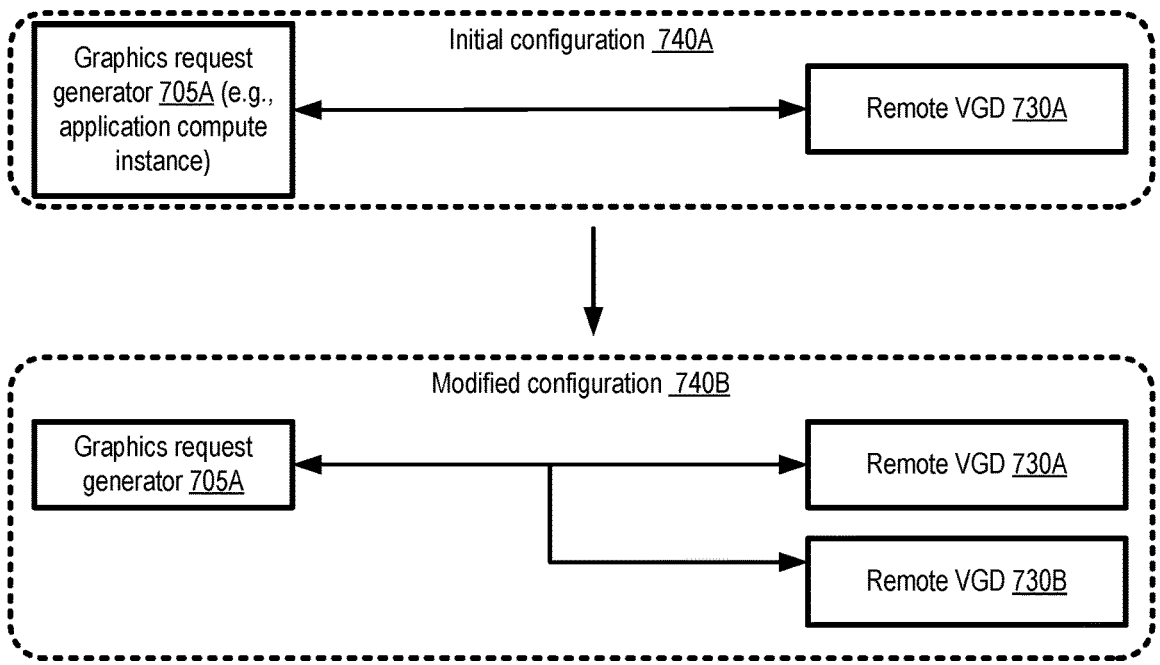
FIG. 7a and FIG. 7b illustrate respective examples of intra-session auto-scaling changes, according to at least some embodiments.
Figure 7B:
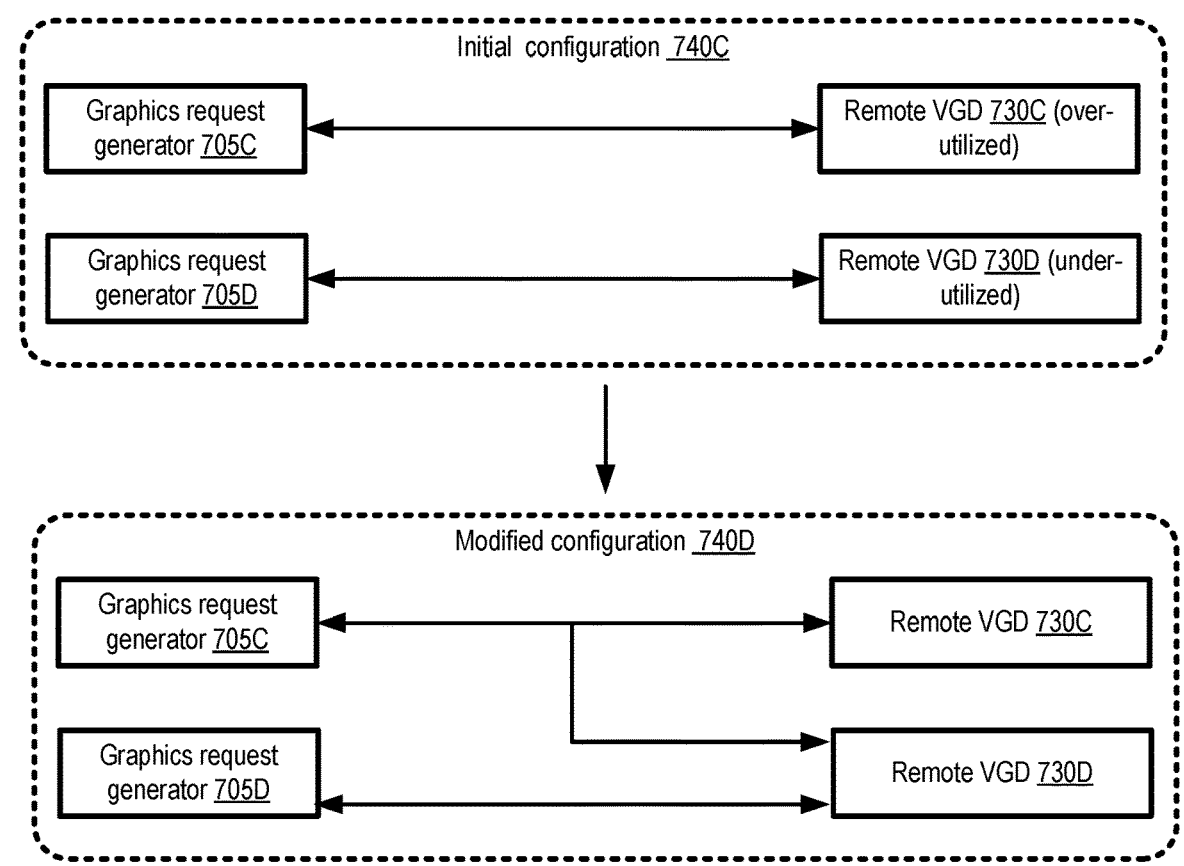

As mentioned earlier, auto-scaling may be implemented at several different levels in some embodiments, including session-initiation level and intra-session level. At the session-initiation level, decisions may be made in accordance with a scaling policy of an auto-scaled resource group, to deploy additional graphics resources for new sessions that are being requested. At the intra-session level, decisions regarding enabling access to additional graphics resources from a particular graphics request generator during an ongoing session may be made in at least some embodiments. FIG. 7a and FIG. 7b illustrate respective examples of intra-session auto-scaling changes, according to at least some embodiments.

In the embodiment depicted in FIG. 7a, in an initial configuration 740A for a session requested by a graphics request generator 705A (e.g., an application compute instance), a single remote virtualized graphics device 730A may be deployed. Various performance metrics associated with the graphics operations being performed during the session may be monitored in the depicted embodiment, such as utilization metrics of the remote VGD 730A or the network paths being used for the graphics-related traffic, response time metrics and/or throughput metrics for various types of graphics operations being requested, and so on. The VGCS control plane may determine, e.g., based at least in part on the metrics and at least in part on unused capacity of the graphics resource pool(s) associated with the session, that an additional remote VGD 730B should be deployed for the session. Accordingly, connection parameters may be transmitted to graphics request generator 705A to enable the establishment of a persistent connection with remote VGD 730B in the depicted embodiment, resulting in modified configuration 740B. In addition, and routing-related configuration changes may be made to enable request packets to flow to VGD 730B from graphics request generator 705A and response packets to flow from VGD 730B to one or more graphics result destinations specified for the session in the embodiment depicted in FIG. 7a. The local graphics driver at the graphics request generator 705 may decide which subset of graphics requests is to be sent to each of the two VGDs 730A and 730B in the depicted embodiment.

In some cases, a given virtualized graphics device may be shared among several graphics request generators based on analysis of performance metrics. In the embodiment depicted in FIG. 7b, remote VGDs 730C and 730D are deployed for respective graphics sessions set up on behalf of graphics request generators 705C and 705D in initial configuration 740C. Based on data collected via monitoring tools or agents, the VGCS control plane may determine that VGD 730D is under-utilized, while VGD 730C is over-utilized in the depicted embodiment. A determination may be made that some of the unused capacity of VGD 730D should be made available to graphics request generator 705C. Connection parameters to enable VGD 730C to be utilized for graphics operation requests may be transmitted to request generator 705C, and the appropriate routing changes may be initiated, resulting in a modified configuration 740D in the depicted embodiment. Using the types of intra-session auto-scaling operations illustrated in FIGS. 7a and 7b, as well as the session-initiation level auto-scaling operations discussed earlier, the VGCS may be able to satisfy diverse dynamically-changing requirements for graphics operations of client applications in various embodiments.

Graphics Resource Pools

As mentioned earlier, several different provisioning modes for auto-scaled virtualized graphics resources may be supported in some embodiments, including for example exclusive provisioning and best-effort provisioning. In at least one embodiment, respective pools of graphics resources may be established for the different provisioning modes. Furthermore, in some embodiments in which the VGCS is implemented at a geographically distributed provider network comprising a plurality of data centers, the physical locations of the hardware used for the virtualized graphics resources (relative to the locations from which the graphics operations requests are expected) may be taken into account when sessions are set up, e.g., so as to reduce transmission times for packets containing graphics operation requests or results of such operations. Multiple geographically distributed pools of graphics resources may be set up in various embodiments for supporting the desired performance levels and/or the different provisioning modes.

Figure 8:
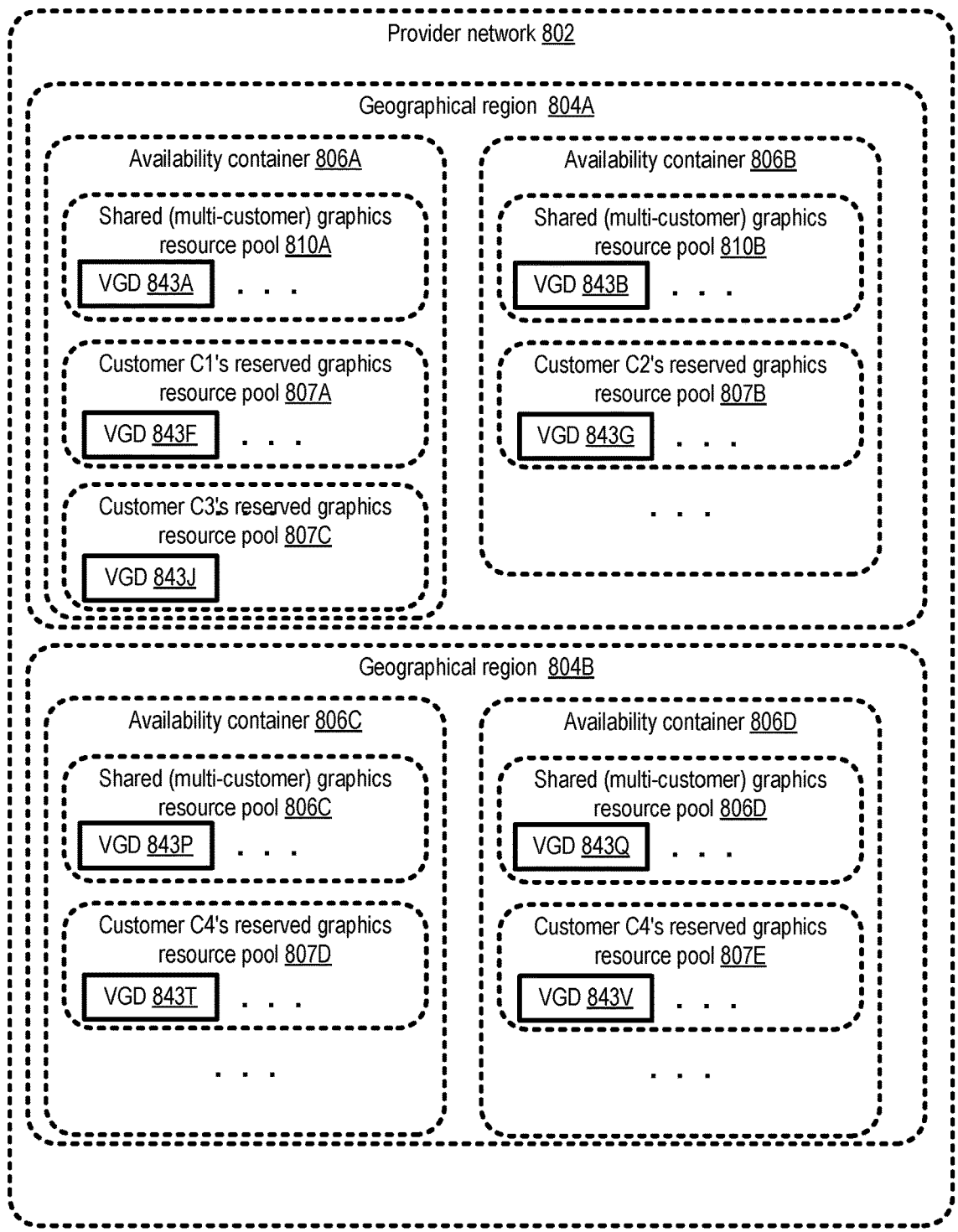
FIG. 8 illustrates example categories of graphics resource pools which may be established at a provider network, according to at least some embodiments.

FIG. 8 illustrates example categories of graphics resource pools which may be established at a provider network, according to at least some embodiments. In the depicted embodiment, provider network 802 comprises resources distributed among various geographical regions, such as region 804A and 804B. Within a given region 804, one or more availability containers 806 may be established, such as availability containers 806A and 806B in region 804A, and availability containers 806C and 806D in region 804B. Availability containers may also be referred to as "availability zones" in some embodiments. An availability container may comprise portions or all of one or more distinct locations or data centers, engineered in such a way (e.g., with independent infrastructure components such as power-related equipment, cooling equipment, or physical security components) that the resources in a given availability container are insulated from failures in other availability containers. A failure in one availability container may not be expected to result in a failure in any other availability container; thus, the availability profile of a given resource is intended to be independent of the availability profile of resources in a different availability container. Various types of services and/or applications may therefore be protected from failures at a single location by launching multiple application instances or resource instances in respective availability containers, or distributing the nodes of a given service across multiple availability containers.

In the embodiment depicted in FIG. 8, two types of graphics resource pools may be created: reserved pools for the exclusive use of graphics sessions of one customer, and shared pools which may be used for graphics sessions of multiple customers. Individual ones of the pools of either type may comprise, for example, respective sets of physical and/or virtual resources, such as graphics hosts comprising GPUs, pre-configured virtualized graphics devices instantiated on such hosts, and the like. In FIG. 8, to avoid clutter, only virtualized graphics devices (which may be pre-configured or may be instantiated after a session request has been accepted) are shown, and the corresponding physical resources such as graphics hosts are not shown. For example, in availability container 806A, reserved pool 807A comprising some number of virtualized graphics devices such as 807A running on a set of graphics hosts may be established for customer C1 and reserved pool 807B comprising VGD 843J may be established for customer C3. Similarly, in availability container 806B, reserved pool 807B comprising VGD 843G may be set up for customer C2. Customer C4 may have two reserved pools of graphics resources allocated in the depicted embodiment, pool 807D in availability container 806C and pool 807E in availability container 806D. Shared pools of graphics resources may be established in each of the availability containers in the depicted embodiment, such as shared pool 810A comprising VGD 843A in availability container 806A, shared pool 810B comprising VGD 843B in availability container 806B, shared pool 806C comprising VGD 843P in availability container 806C and shared pool 806D comprising VGD 843Q in availability container 806D.

The reserved pools 807 may be established in response to respective requests for auto-scaled resource groups in exclusive provisioning mode in the depicted embodiment. The specific availability container within which a reserved pool is set up may be selected based at least in part on a preferred-location parameter of the auto-scaled group setup request, or based on the location of the graphics request generators. For example, if most of the graphics operation requests directed to a particular auto-scaled group are expected from a particular geographical region (whether the requesters are application compute instances inside the provider network, or hosts external to the provider network), one or more availability containers located in or near that region may be used. Similarly, the particular shared pool 806 from which VGDs are allocated or deployed for a given session request may be selected based at least in part on geographical proximity to the graphics request generator for which the session is to be established in some embodiments.

Methods for Auto-Scaled Remote Virtualized Graphics Operations

Figure 9:
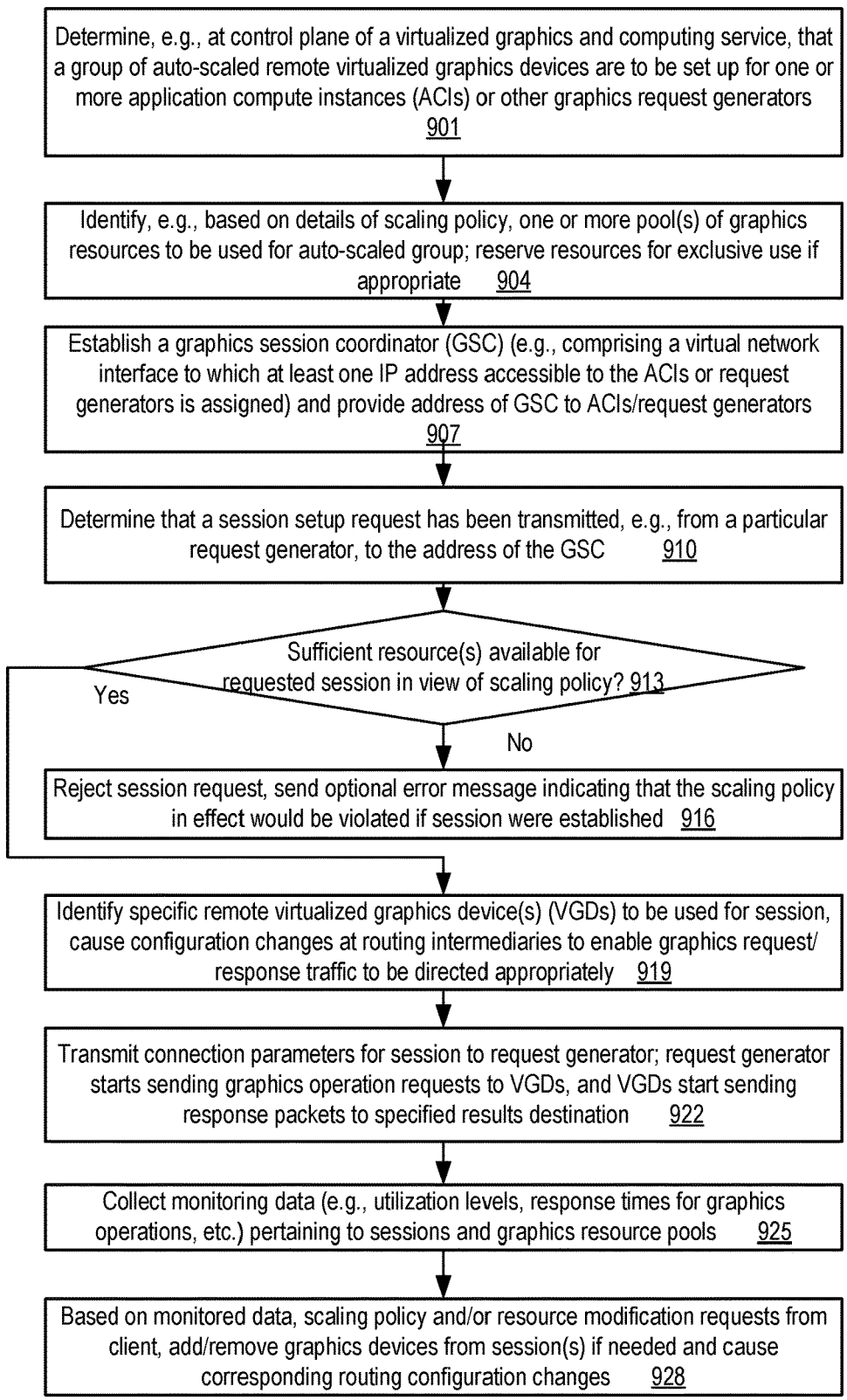
FIG. 9 is a flow diagram illustrating aspects of operations that may be performed to support automated scaling of virtualized graphics resources, according to at least some embodiments.

FIG. 9 is a flow diagram illustrating aspects of operations that may be performed to support automated scaling of virtualized graphics resources, according to at least some embodiments. As shown in element 901, a determination may be made, e.g., at a control plane component of a VGCS at a provider network, that a group of auto-scaled remote virtualized graphics resources or devices is to be set up for use by one or more application compute instances or other graphics request generators. Such a determination may be made, for example, in response to receiving an auto-scaled resource group setup request similar to that discussed in the context of FIG. 4 in some embodiments.

One or more pools of graphics resources from which VGDs are to be deployed for the sessions initiated by the graphics request generators may be identified and/or populated (element 904) in the depicted embodiment. For example, if exclusive provisioning is to be used, a new pool comprising the maximum number of VGDs indicated in the scaling policy may be established, and if best-effort provisioning is indicated, a shared pool of VGDs may be selected (or created, if such a pool has not been established yet in the appropriate availability container or geographical region). The physical proximity of the pool to the prospective graphics resource requesters may be among the factors considered in selecting the particular pool in at least some embodiments.

A graphics session coordinator (GSC) may be established for the auto-scaled group in the depicted embodiment (element 907). The GSC may comprise a virtual network interface with one or more network addresses accessible to the prospective graphics resource requesters for which the auto-scaled group is being established. For example, a private IP address may be identified for the virtual network interface within an isolated virtual network comprising a set of application compute instances which are to use the graphics resources in some embodiments. In other embodiments, a public IP address accessible from external networks such as the Internet may be used. The address(es) to be used to communicate with the GSC may be transmitted to the client requesting the auto-scaled group, and/or provided to the graphics request generators in some embodiments.

A determination may be made at the VGCS control plane that a request for a graphics session has been submitted by a graphics request generator, e.g., using one or more packets with the GSC's network address indicated as the destination address (element 910). In some embodiments, the session request may indicate resource requirements, such as the number of virtualized graphics devices of one or more types to be used during the graphics session. In at least one embodiment, a default number (e.g., one) of remote virtualized graphics may be assumed as the requirement if no specific requirement is indicated in the session request. In one embodiment, the session request may indicate a performance goal (e.g., the number of graphics operations of a certain type which are to be performed per second), and the VGCS control plane may translate the performance requirements into the number of graphics devices of one or more types which are to be deployed.

The VGCS control plane may make a determination as to whether, in view of the scaling policy associated with the auto-scaled group set up for the graphics request generator, sufficient resources are available for the requested session. If the resources requested can be deployed without violating the scaling policy and the appropriate pools contain enough resources for the session, as determined in element 913, one or more remote virtualized graphics devices that meet the requirements of the session may be identified from the appropriate pools (element 919). Configuration operations which enable packets containing graphics operation requests from the request generator to be transmitted to the remote virtualized graphics device(s) may be initiated, e.g., by generating the appropriate routing metadata or mappings at the VGCS control plane and transmitting the metadata to a routing service. Similarly, configuration operations that enable packets containing the results of the graphics operations to be directed to a specified result destination for the session may be performed in the depicted embodiment.

Connection parameters for the session may be transmitted to the graphics request generator in the depicted embodiment (element 922). The request generator may start sending graphics operation requests to the VGD(s), and the VGD(s) in turn may start performing the requested operations and sending responses to the results destinations. The VGCS control plane may collect monitoring data (e.g., utilization levels, response times for graphics operations, etc.) pertaining to sessions and graphics resource pools in the depicted embodiment (element 925). Based on the monitored data, the scaling policy and/or resource modification requests from the client, graphics devices may be dynamically added to or removed from the graphics session(s) (element 928), and the corresponding routing configuration changes may be performed when such devices are added or removed.

If, in operations corresponding to element 913, a determination is made that the requested session requires resources whose deployment would violate the scaling policy, the session request may be rejected in the depicted embodiment (element 916), and an optional error message may be transmitted to the session request source indicating that the scaling policy in effect would be violated if the session were established.

In at least some embodiments, a graphics session coordinator may be set up as a conduit or mechanism for requesting graphics sessions in general, and may not necessarily be tied to a particular auto-scaled resource group or a scaling policy. For example, in one embodiment, a graphics session coordinator may be established in response to a determination that remote virtualized graphics processing is to be enabled for a set of graphics request generators, without any specific auto-scaling requirements. Such a general-purpose graphics session coordinator may be used in various embodiments to set up and tear down graphics sessions in a manner similar to that described herein for sessions established with respect to auto-scaled graphics resource groups. Before approving a new session or adding resources to an existing session, such a general-purpose graphics session coordinator may check whether the VGCS as a whole has enough unused graphics resources in some embodiments.

It is noted that in various embodiments, some of the operations shown in FIG. 9 may be implemented in a different order than that shown in the figure, or may be performed in parallel rather than sequentially. Additionally, some of the operations shown in FIG. 9 may not be required in one or more implementations.

Use Cases

The techniques described above, of supporting automated scaling of remote virtualized graphics processing using configurable graphics session coordinators, may be useful in a variety of scenarios. A wide variety of applications may be able to benefit from advanced graphics processing capabilities, such as applications in the domains of game streaming, rendering, financial modeling, engineering design, scientific visualization/simulation, and the like. Executing such applications on conventional CPUs may not be efficient, especially for large data sets. Using remote-attached virtualized graphics devices may be a more suitable approach for at least some such applications. However, for some such applications, it may not always be possible to predict the amount of graphics processing in advance. The auto-scaling and graphics session management techniques outlined herein may enable customers of a virtualized graphics and computing service to deal with varying graphics workloads with relatively little effort, leaving most of the work of selecting the appropriate graphics resources as the workloads change to the service while ensuring that approved scaling policies are enforced.

Illustrative Computer System

Figure 10:
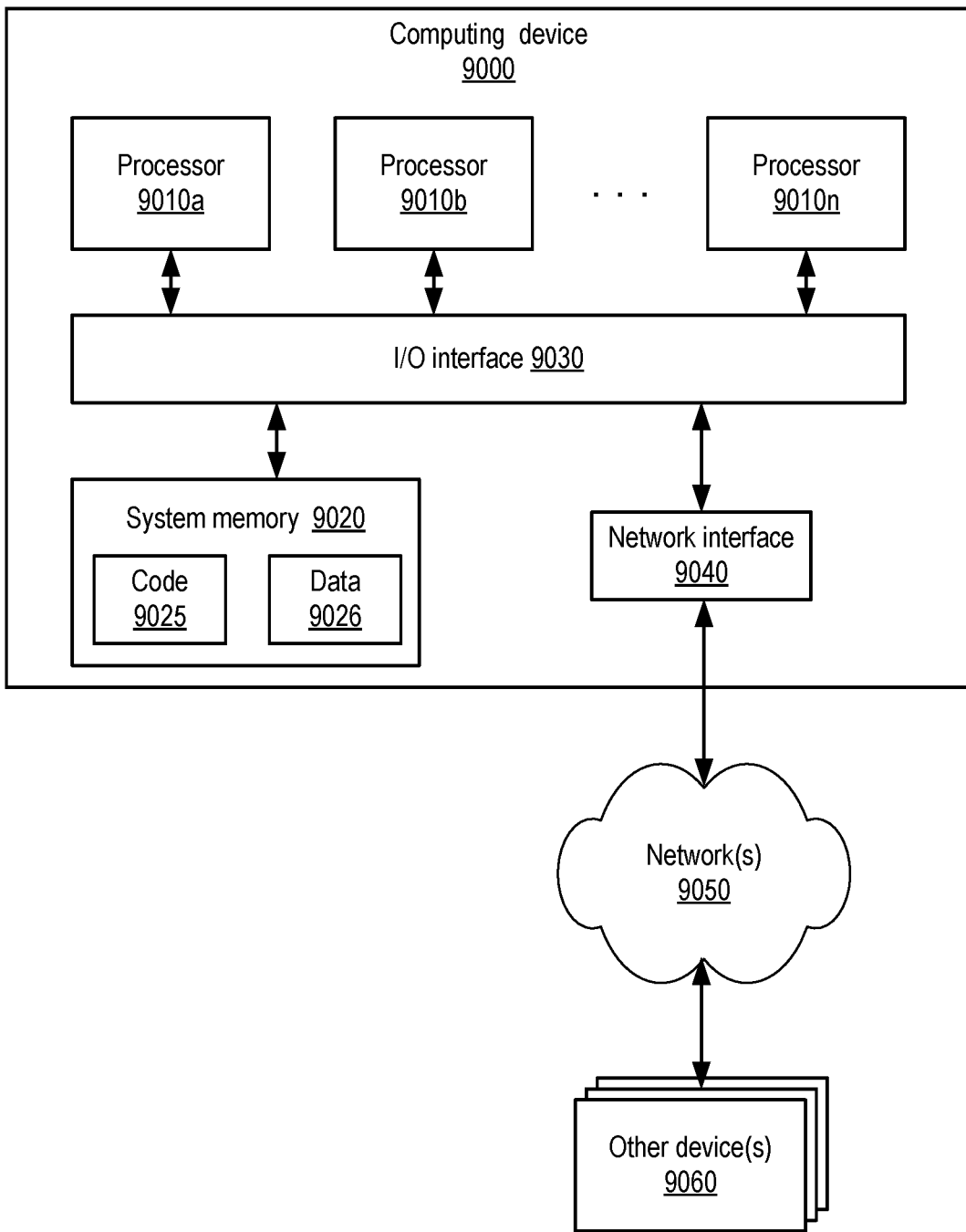
FIG. 10 is a block diagram illustrating an example computing device that may be used in at least some embodiments.

In at least some embodiments, a server that implements one or more of the techniques described above for managing traffic associated with virtualized graphics processing, including a configuration manager, an auto-scaling manager, routers, and various other control plane and data plane entities of a virtualized graphics and computing service or a routing service, may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a Low Pin Count (LPC) bus, a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 9 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a configuration manager executing on one or more computing devices of a provider network;
wherein the configuration manager includes instructions that upon execution on a processor cause the one or more computing devices to:
establish a first graphics session coordinator within an isolated virtual network, wherein at least a first network address of the first graphics session coordinator is accessible from one or more application compute instances in the isolated virtual network;
in response to determining that a scaling policy would not be violated as a result of establishing a first graphics session and a request for the first graphics session is directed to the first graphics session coordinator from a first application compute instance of the isolated virtual network:
instantiate a first remote virtualized graphics device using a first host comprising one or more graphics processing units (GPUs), wherein the first remote virtualized graphics device is accessible to the first application compute instance over a network to perform one or more graphics operations; and
cause a configuration operation at one or more routing devices to enable (a) request packets of the one or more graphics operations from the first application compute instance to be delivered over the network to the first remote virtualized graphics device and (b) response packets of the one or more graphics operations from the first virtualized remote virtualized graphics device to be delivered over the network to the first application compute instance; and in response to determining that the scaling policy would be violated, cause a message indicating a violation of the scaling policy to be delivered to a destination.

2. The system as recited in claim 1, wherein the configuration manager includes instructions that upon execution on a processor cause the one or more computing devices to:

assign, to a second graphic session coordinator configured within the provider network, a public network address, wherein the public network address is accessible from a particular host external to the provider network;

cause, in response to a configuration request directed to the public network address, a second graphics session to be established between the particular host and a second remote virtualized graphics device, wherein the second remote virtualized graphics device is instantiated within the provider network.

3. The system as recited in claim 1, wherein the configuration manager includes instructions that upon execution on a processor cause the one or more computing devices to:

transmit, to the first application compute instance after determining that the scaling policy would not be violated, a destination network address to be used for a request packet of the one or more graphics operations.

4. The system as recited in claim 1, wherein the configuration manager includes instructions that upon execution on a processor cause the one or more computing devices to:

store an indication that a pool of one or more remote virtualized graphics devices, including the first remote virtualized graphics device, has been reserved for use by the one or more application compute instances.

5. The system as recited in claim 1, wherein the configuration manager includes instructions that upon execution on a processor cause the one or more computing devices to:

select the first host from a shared pool of resources designated for graphics sessions of a plurality of clients.

6. A method, comprising:

performing, by on one or more computing devices:

assigning a first network address to a first graphics session coordinator, wherein the first network address is accessible from one or more graphics request generators; and in response to determining that a first request for a first graphics session has been submitted on behalf of a first graphics request generator to the first network address and that a resource constraint associated with the one or more graphics request generators would not be violated by establishing the first graphics session:

selecting a first remote virtualized graphics device using a first host comprising one or more graphics processing units (GPUs), wherein the first remote virtualized graphics device is accessible to the first graphics request generator over a network to perform one or more graphics operations; and causing a first configuration operation at one or more routing devices to enable (a) one or more graphics operation request packets from the first graphics request generator to be delivered over a network to the first remote virtualized graphics device and (b) one or more graphics operation response packets from the first virtualized remote virtualized graphics device to be delivered over the network to the first graphics request generator.

7. The method as recited in claim 6, further comprising performing, by the one or more computing devices:

in response to determining that a second request for a second graphics session on behalf of a second graphics request generator has been submitted to the first network address, causing a second configuration operation at the one or more routing devices to enable (a) one or more graphics operation request packets from the second graphics request generator to be delivered to the first host at which the first remote virtualized graphics device was instantiated and (b) one or more graphics operation response packets from the first host to be delivered to the second graphics request generator.

8. The method as recited in claim 7, further comprising performing, by the one or more computing devices:

prior to causing the second configuration operation, terminating the first graphics session, wherein said terminating comprises overwriting at least a portion of a memory used in the first graphics session.

9. The method as recited in claim 6, further comprising performing, by the one or more computing devices:

indicating, to the first graphics request generator after determining that the resource constraint would not be violated, a destination network address to be used for transmitting requests for graphics operations.

10. The method as recited in claim 9, wherein the destination network address is an address assigned to the first remote virtualized graphics device.

11. The method as recited in claim 9, wherein the destination network address is the first network address.

12. The method as recited in claim 6, further comprising performing, by the one or more computing devices:

storing an indication that a pool of one or more remote virtualized graphics devices, including the first remote virtualized graphics device, has been reserved for use by the one or more graphics request generators.

13. The method as recited in claim 6, wherein instantiating the first remote virtualized graphics device uses one or more resources of a shared pool of resources designated for graphics sessions of a plurality of clients.

14. The method as recited in claim 6, wherein the first graphics session coordinator is configured within a provider network, the method further comprising:

assigning, to a second graphic session coordinator configured within the provider network, a public network address, wherein the public network address is accessible from a particular host external to the provider network;

causing, in response to a configuration request directed to the public network address, a second graphics session to be established between the particular host and a second remote virtualized graphics device, wherein the second remote virtualized graphics device is instantiated within the provider network.

15. The method as recited in claim 6, further comprising performing, by the one or more computing devices:

causing at least a portion of contents of a particular graphics operation response packet generated at the first remote virtualized graphics device to be stored in a client-side graphics cache; and in response to a particular graphics operation request of the first graphics session, causing the particular graphics operation request to be satisfied using the client-side graphics cache, without directing a corresponding graphics operation request packet to the first remote virtualized graphics device.

16. A non-transitory computer-accessible storage medium storing program instructions that when executed on one or more processors cause the one or more processors to:

in response to a request for a graphics session coordinator, establish a first graphics session coordinator with a first network address, wherein the first network address is accessible from one or more graphics request generators;

determine that a first request for a first graphics session on behalf of a first graphics request generator has been submitted to the first network address;

select a first remote virtualized graphics device accessible to the first graphics request generator over a network to perform one or more graphics operations; and cause a first configuration operation at one or more routing devices to enable (a) one or more graphics operation request packets from the first graphics request generator to be delivered over a network to the first remote virtualized graphics device and (b) one or more graphics operation response packets from the first virtualized remote virtualized graphics device to be delivered over the network to a graphics results destination.

17. The non-transitory computer-accessible storage medium as recited in claim 16, wherein the one or more graphics request generators comprise an application compute instance established within a first isolated virtual network, wherein the instructions when executed on one or more processors cause the one or more processors to:

assign, to the first graphics session coordinator, the first network address, wherein the first network address which is not accessible outside the first isolated virtual network.

18. The non-transitory computer-accessible storage medium as recited in claim 16, wherein the instructions when executed on one or more processors cause the one or more processors to:

identify, based at least in part on a provisioning mode associated with the first graphics session, a pool of resources from which the first remote virtualized graphics device is to be selected, wherein the provisioning mode comprises one or more of: an exclusive mode, or a best-effort mode.

19. The non-transitory computer-accessible storage medium as recited in claim 16, wherein the instructions when executed on one or more processors cause the one or more processors to:

determine a scaling policy for an auto-scaled group of virtualized graphics resources associated with the first graphics session coordinator, wherein the scaling policy includes a resource constraint.

20. The non-transitory computer-accessible storage medium as recited in claim 16, wherein the instructions when executed on one or more processors cause the one or more processors to:

analyze one or more performance metrics associated with the first graphics request generator;

determine, based at least in part on (a) a result of said analyzing and (b) a resource constraint associated with the one or more graphics request generators, that a second remote virtualized graphics device is to be allocated to the first graphics request generator; and cause a second configuration operation at one or more routing devices to enable (a) one or more graphics operation request packets from the first graphics request generator to be delivered to the second remote virtualized graphics device and (b) one or more graphics operation response packets from the second virtualized remote virtualized graphics device to be delivered to the first graphics request generator.

* * * * *